US00RE39834E

(19) United States
(12) Reissued Patent
Kieranen et al.

(10) Patent Number: US RE39,834 E
(45) Date of Reissued Patent: Sep. 11, 2007

(54) APPARATUS AND METHOD FOR THREE-DIMENSIONAL CONTOURING

(75) Inventors: Carl B. Kieranen, Chassell, MI (US); Charles A. Hallstrom, Calumet, MI (US); Glen R. Simula, Hancock, MI (US); Nils P. Ruonavaara, Atlantic Mine, MI (US); James D. Waineo, Chassell, MI (US)

(73) Assignees: Michigan Technological University, Houghton, MI (US); Somero Enterprises, Inc., Jaffrey, NH (US)

(21) Appl. No.: 10/430,727
(22) Filed: May 6, 2003

Related U.S. Patent Documents

Reissue of:
(64) Patent No.: 6,227,761
Issued: May 8, 2001
Appl. No.: 09/179,648
Filed: Oct. 27, 1998

(51) Int. Cl.
*E01C 23/07* (2006.01)
*E01C 23/085* (2006.01)

(52) U.S. Cl. ..... 404/84.5; 404/83; 404/84.05; 404/84.1; 404/84.2; 404/118; 404/120

(58) Field of Classification Search ..... 404/83, 404/118, 101, 102, 104, 114, 84.05–84.8, 404/120; 172/4.5
See application file for complete search history.

(56) References Cited

U.S. PATENT DOCUMENTS 1,782,707 A 11/1930 Bayley (Continued)

FOREIGN PATENT DOCUMENTS

DE 3623570 1/1988

(Continued)

OTHER PUBLICATIONS

Spectra–Physics BLADE–PRO Motorgrader Control System Owner's Manual; 1992.

(Continued)

*Primary Examiner*—Raymond Addie
(74) *Attorney, Agent, or Firm*—Van Dyke, Gardner, Linn & Burkhart, LLP

(57) ABSTRACT

A contouring device and method for contouring three-dimensionally curved surfaces includes an elongated contouring assembly that is supported at opposite ends by a pair of fluid cylinders. The fluid cylinders are controlled to raise and lower the ends of the contouring assembly independently of each other, thereby allowing the contouring assembly to create a three-dimensionally curved surface as it passes over an area to be contoured. The control of one of the fluid cylinders is based on a comparison of the measured position of a first end of the contouring assembly with a profile of the surface to be leveled that is stored in a computer memory. The measurement of the position of the first end of the contouring assembly is achieved by a tracking device which tracks the position of a target positioned on the first end of the contouring assembly and which determines the three dimensional position of the target. A proximity sensor measures the position of the second end of the contouring assembly from a surface and outputs a control signal that adjusts the height of the second end of the contouring assembly to follow the surface. Alternatively, a second target positioned on the second contouring assembly end is tracked by a second tracking device to determine the three-dimensional position of the second end. The contouring assembly preferably has a plow, rotating auger, and a vibratory screed positioned adjacent and parallel to one another in an orientation transverse to the direction of motion of the contouring assembly. The plow, rotating auger, and vibratory screed are all pivotable about an axis parallel to their longitudinal direction. A pivot or tilting controller controls the tilting of the plow, rotating auger, and vibratory screed to follow the slope of the profile stored in computer memory.

36 Claims, 17 Drawing Sheets

U.S. PATENT DOCUMENTS

| | | | |
|---|---|---|---|
| 2,094,910 | A | 10/1937 | Baily |
| 2,796,685 | A | 6/1957 | Bensinger |
| 3,247,770 | A | 4/1966 | Perkins et al. |
| 3,377,933 | A | 4/1968 | Dale |
| 3,435,740 | A | 4/1969 | McGall |
| 3,533,337 | A | 10/1970 | Swisher et al. |
| 3,554,291 | A | 1/1971 | Rogers |
| 3,604,325 | A | 9/1971 | Borges |
| 3,790,277 | A | 2/1974 | Hogan |
| 3,870,427 | A | 3/1975 | Allen |
| 3,953,145 | A | 4/1976 | Teach |
| 4,073,592 | A | 2/1978 | Godberson et al. |
| 4,244,123 | A | 1/1981 | Lazure et al. |
| 4,253,778 | A | 3/1981 | Morrison |
| 4,374,420 | A | 2/1983 | Wolters |
| 4,465,397 | A | 8/1984 | Hollon et al. |
| 4,484,834 | A | 11/1984 | Rowe et al. |
| 4,493,585 | A | 1/1985 | Axer |
| 4,655,633 | A | 4/1987 | Somero et al. |
| 4,700,301 | A | 10/1987 | Dyke |
| 4,752,156 | A | 6/1988 | Owens |
| 4,807,131 | A | 2/1989 | Clegg |
| 4,854,769 | A | 8/1989 | Fukukawa et al. |
| 4,861,189 | A | 8/1989 | Fukukawa et al. |
| 4,930,935 | A | 6/1990 | Quenzi et al. |
| 4,978,246 | A | 12/1990 | Quenzi et al. |
| 5,005,652 | A | 4/1991 | Johnson |
| 5,009,544 | A | 4/1991 | Chaize |
| 5,039,249 | A | 8/1991 | Hansen |
| 5,100,229 | A | 3/1992 | Lundberg et al. |
| 5,144,317 | A | 9/1992 | Duddek et al. |
| 5,156,487 | A | 10/1992 | Haid |
| 5,201,604 | A | 4/1993 | Ferguson et al. |
| 5,224,793 | A | 7/1993 | De Pol et al. |
| 5,258,961 | A | 11/1993 | Sehr et al. |
| 5,288,166 | A | 2/1994 | Allen et al. |
| 5,288,167 | A | 2/1994 | Gaffard et al. |
| 5,328,295 | A | 7/1994 | Allen |
| 5,356,238 | A | 10/1994 | Musil et al. |
| 5,375,663 | A | 12/1994 | Teach |
| 5,408,751 | A | 4/1995 | Rodloff et al. |
| 5,549,412 | A | 8/1996 | Malone |
| 5,579,102 | A | 11/1996 | Pratt et al. |
| 5,588,776 | A | 12/1996 | Swisher, Jr. et al. |
| 5,612,864 | A | 3/1997 | Henderson |
| 5,631,658 | A | 5/1997 | Gudat et al. |
| 5,646,844 | A | 7/1997 | Gudat et al. |
| 5,752,783 | A | 5/1998 | Malone |
| 5,764,511 | A | 6/1998 | Henderson |
| 5,771,978 | A | 6/1998 | Davidson et al. |
| 5,951,613 | A | 9/1999 | Sahm et al. |
| 5,964,298 | A | 10/1999 | Greenspun |
| 6,047,227 | A | 4/2000 | Henderson et al. |
| 6,088,644 | A | 7/2000 | Brandt et al. |
| 6,171,018 | B1 | 1/2001 | Ohtomo et al. |
| 6,227,761 | B1 | 5/2001 | Kieranen et al. ..... 404/84.5 |

FOREIGN PATENT DOCUMENTS

| | | | |
|---|---|---|---|
| EP | 0102060 | 7/1984 | |
| EP | 0102060 A3 | 7/1984 | ..... 19/42 |
| GB | 1182385 | 2/1970 | |
| JP | 1047961 | 2/1989 | |
| NL | 53878 | 9/1942 | |
| NL | 9401774 | 3/1996 | |
| WO | 9401812 | 1/1994 | |

OTHER PUBLICATIONS

Screed King, TSK 308 Brochure published more than one year prior to filing date of current application.

Scrrr–eed Concrete Screed Attachment by Van–Boh Systems, Inc. Brochure dated Jan. 1998.

English–language abstract of previously submitted European Patent 0102060.

English–language abstract of previously submitted German patent DE3623570.

English–language abstract of previously submitted Netherlands Patent NL9401774.

Exhibit D Partial English–language translation of previously submitted German Patent DE3623570 (column 5, line 13, to end of specification).

European Search Report dated Feb. 19, 2002 for application EP 99 30 8506, which is a foreign counterpart to the present application, namely U.S. Appl. No. 09/792,760.

Examiner report dated Jul. 24, 2002 from the Australian Patent Office regarding Australian patent application 52585/99, which is the Australian counterpart to the grandparent of the present application, namely U.S. Appl. No. 09/179,648.

Walt Moore, "Grade–Control System Creates Virtual Stringline," *Construction Equipment*, Mar. 18, 1998, pp. 105–106.

Trimble, "Site Vision GPS Automatic Grade Control System: Technical Notes, " pp. 1–8, Copyright 1997–2001.

Topcon, "Motorgrader System Four Plus" brochure, Copyright 1998.

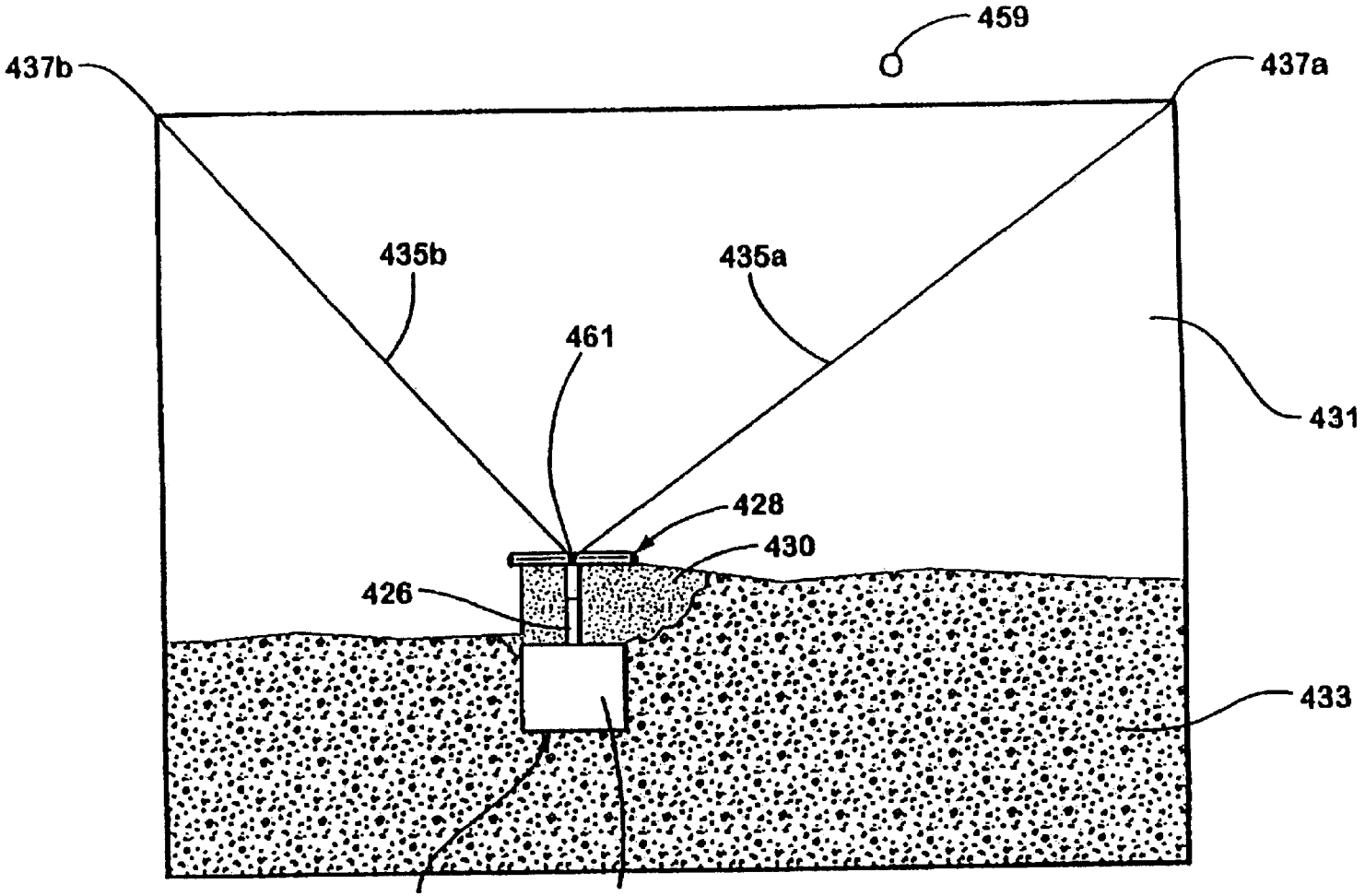
Fig. 14
(Amended)

APPARATUS AND METHOD FOR THREE-DIMENSIONAL CONTOURING

Matter enclosed in heavy brackets [ ] appears in the original patent but forms no part of this reissue specification; matter printed in italics indicates the additions made by reissue.

BACKGROUND OF THE INVENTION

This invention relates generally to methods and devices for contouring or smoothing freshly poured concrete, sand, gravel, dirt, or other like loose, spreadable materials, and, more particularly, to an apparatus and method for contouring and placement of such materials with a vehicle either positioned adjacent the materials to be contoured or driven through the materials to be contoured.

In the past, the screeding or smoothing of uncured concrete by screeding machines has been primarily limited to flat, one or two dimensional surfaces. In order to screed a three dimensional concrete surface, the screeding apparatus was required to follow predetermined or preset forms, such as wires, boards, or rails, stationed along both sides of the surface to be screeded. Each end of the screed would follow the predetermined physical form. By using preset physical forms of different shapes or slopes on either side of the surface to be screeded, it is possible to create a smooth surface having a three dimensional curvature. The use of present physical forms, however, presents several disadvantages.

The creation of the physical forms is a labor intensive process that increases the time and expense necessary to establish a contoured surface. The preset physical forms also typically only approximate the desired shape of the surface to be contoured, thereby decreasing the quality of the contoured surface. For example, if the physical form consists of a wire, it is virtually impossible to accurately define a desired curvature. Rather, the wire approximates the curvature by a series of successive straight segments. These and other disadvantages of prior screeding techniques have led to the desire to reduce reliance on preset physical forms.

In the past, non-concrete contouring machines have been developed for contouring three dimensional surfaces without the use of preset physical forms. These devices, however, require contact sensors for creating a profile of the subbase over which a material is placed and contoured. These devices have also been limited to earth grading, asphalt laying, or other non-concrete leveling tasks. An example of such a prior device is disclosed in U.S. Pat. No. 5,549,412 issued to Malone. This patent discloses a device for profiling and paving asphalt surfaces in three dimensions. The paving device includes a data storage device for storing the profile of the subbase to be contoured. The accuracy of the profile is dependent upon the frictional and physical characteristics of the contact sensor with respect to the subbase. The contact nature of the sensor may introduce errors into the profile creation that are undesirable.

Some prior art grading machines have also been dependent upon the profile of the subbase. Such machines can only be effectively used after the subbase has been contoured to the desired shape. This increases the amount of work required to screed a concrete surface. Some prior art grading devices have also required the generation of the profile by running the sensors over the subgrade prior to the contouring step. This profile generation step may result in additional inaccuracies due to alignment errors of the contact sensor during the contouring step when compared with the profiling step. This further increases the inaccuracies in the system. Another disadvantage of the prior art is the required use of multiple sensors to determine the position of the contouring structure in three dimensions. For example, in U.S. Pat. No. 4,807,131 issued to Clegg, a grading system is disclosed that uses a laser reference beam in combination with a pair of wheel encoders. The laser reference beam is used to establish the vertical height of the grading blade while the encoders measure the horizontal position of the grading blade. The use of multiple sensors increases the complexity and associated cost of the grading system, and is therefore undesirable for many applications.

SUMMARY OF THE INVENTION

The present invention is an improved device and method for contouring poured uncured concrete, sand, gravel, dirt, or like loose, spreadable viscous fluid or plastic materials on the ground or on suspended decks, parking structures, or other surfaces. The present invention provides a device and method for contouring three dimensional curved surfaces without the necessity of preset physical forms on both sides of the surface to be contoured. The present invention also provides a simple and effective way for contouring surfaces that overcomes the measurement inaccuracies of various prior art machines.

In one aspect, the invention is an improved control system for controlling a contouring machine while a contouring assembly on the machine is moved over an area to be contoured. The system includes a controller for controlling the height of a first end of the contouring assembly. One of a tracking device and a target are positioned on the first end of the contouring assembly and the other of the tracking device and the target is positioned remotely from the contouring assembly. The tracking device tracks the position of the target and measures the position of the target in three dimensions as the assembly is moved over the area to be contoured. The measurement of the target is used by a controller which adjusts the height of the first end of the contouring assembly to correspond to a stored profile of the desired shape of the surface to be contoured.

According to a second aspect, the invention is a device for contouring a surface which includes a contouring assembly having first and second ends. A first sensing apparatus is positioned on one end of the assembly, while a second sensing apparatus that is different from the first sensing apparatus is positioned on the second end of the assembly. A controller adjusts the height of the first end of the assembly based on a stored profile of the desired shape of the surface to be contoured. The controller adjusts the height of the second end of the assembly based on the distance between the second end of the assembly and a reference surface along one side of the area to be contoured.

According to a third aspect, the invention is a device for contouring a surface that includes a boom movable mounted on a base. A contouring assembly is mounted at an end of the boom opposite to the base, and the assembly has a first and second end that are independently adjusted by a control system. As the contouring assembly is moved over the area to be contoured, the independent control of the first and second ends of the assembly allows the device to contour a three dimensional surface.

According to a fourth aspect, the invention is a contouring assembly for contouring a surface to its desired shape. The invention includes a support having first and second ends, an elongated contouring assembly, and a height adjustment mechanism attached to the support and the contouring assembly. The height adjustment mechanism is adapted to adjust the height of the contouring assembly with respect to the support based on the desired shape of the surface to be contoured. The contouring assembly is pivotally attached to the support and controlled by a pivot adjustment mechanism that pivots the contouring assembly about a pivot axis based also on the desired shape of the surface to be contouring.

In another aspect, the invention is a method for contouring a surface to a desired three dimensional shape and includes the steps of storing the desired three dimensional shape in a computer memory and providing a contouring assembly having first and second ends. As the contouring assembly is moved over the area to be leveled, the position of the first end of the contouring assembly is determined in three dimensions. The height of the first end of the contouring assembly is then adjusted to correspond to the height of the desired three dimensional shape. The distance between the second end of the contouring assembly and a reference surface is also determined as the contouring assembly is moved over the area to be contoured, and the height of the second end of the contouring assembly is adjusted to maintain a constant height above the reference surface.

In yet another aspect, the invention is a kit for modifying a previously existing one or two dimensional or screeding machine in order to allow it to be capable of contouring three dimensionally curved surfaces. The kit is preferably adapted for use with previous one or two dimensional leveling machines which include a leveling assembly with first and second ends that are each uniformly controlled by height adjustment mechanisms. The kit includes a target for attaching to either the first or the second end of the leveling assembly, and a tracking device that tracks the target and measures its position in three dimensions. A control system is included with the kit that operates each height adjustment mechanism independently of the other based on the measured position of the target. The independent control of the height adjustment mechanisms allows a three dimensionally curved shape to be contoured, if desired. In different embodiments, the kit may include different components. For example, the kit may include a segmented screed, in addition to the previously listed components, to allow screeding a surface the approximates a higher degree of curvature. In other embodiments the kit may include a pair of wires for attaching to two separate reference points, a pair of distance encoders that measure the length of the wires as the leveling or smoothing assembly moves, and a pair of angle encoders that measure the angles defined between the wires and the leveling assembly. A control system is included in the kit that determines the position of the leveling assembly based on the length of each of the wires from the two reference points.

In another aspect, the invention is a contouring machine comprising a screed for spreadable materials including poured, uncured concrete, a height adjustment mechanism for adjusting the height of the screed on the contouring machine, a target, a tracking device which tracks the target and measures the position of the target in at least two dimensions, one of the target and tracking device positioned on the machine and the other of the target and tracking device positioned at a location remote from the machine, and a controller for controlling the height adjustment mechanism based on the position of the target with respect to the tracking device. This aspect of the invention also includes a method for moving the screed over the spreadable material and adjusting the height of the screed as the screed is moved over the spreadable material such that the spreadable material is contoured.

Accordingly, the present contouring device and method provide improvements and advantages over prior contouring devices and methods. The invention allows the smoothing of either a one, two, or three dimensional curved surface without the use of contact sensors, and also without the use of preset physical forms on both sides of the contouring device. The present invention thereby eliminating substantial time and labor expenses while providing improved accuracy in the final, contoured surface. The use of a single measuring device for tracking the position of one end of the contouring assembly further reduces the complexity and cost of the invention. The invention does not require passing the device over the surface to be contoured prior to the actual contouring step, thereby reducing the number of steps involved in the contouring process. Moreover, the contouring device does not have to be moved in a predetermined direction during the contouring process, thereby simplifying the contouring procedure. The invention can smooth a surface either independently of the subbase, or dependent on the subbase, if desired. The invention can also be used as a kit to retrofit existing leveling machines that are only capable of smoothing one or two dimensional surfaces.

These and other objects, advantages, purposes, and features of the invention will become more apparent from the study of the following description when read in conjunction with the drawings.

BRIEF DESCRIPTION OF THE DRAWINGS

FIG. 14 is a plan view of a contouring device according to a fourth embodiment of the present invention.

DESCRIPTION OF THE PREFERRED EMBODIMENTS

Figure 1:
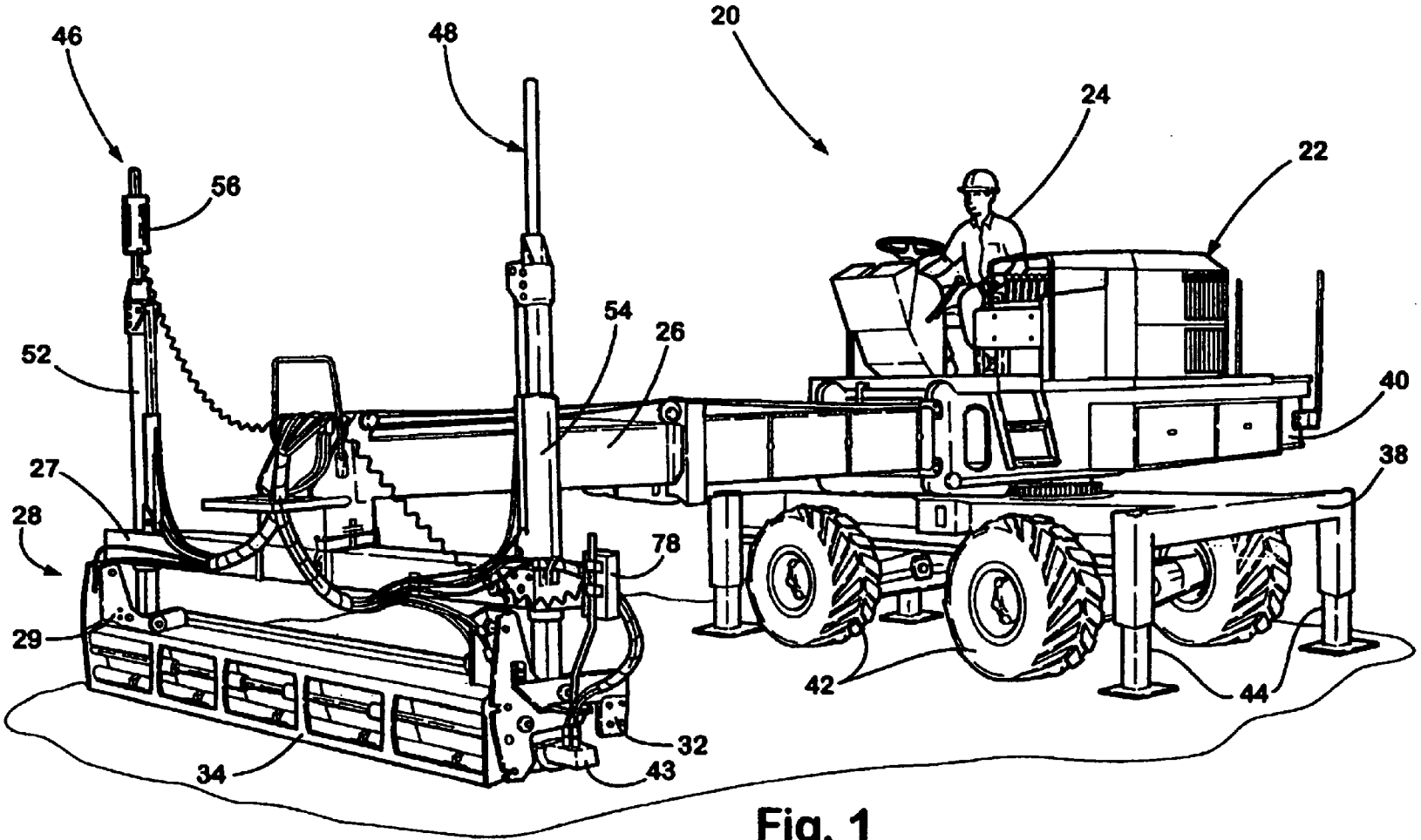
FIG. 1 is a perspective view of a first embodiment of the contouring device according to the present invention.
Figure 9A:
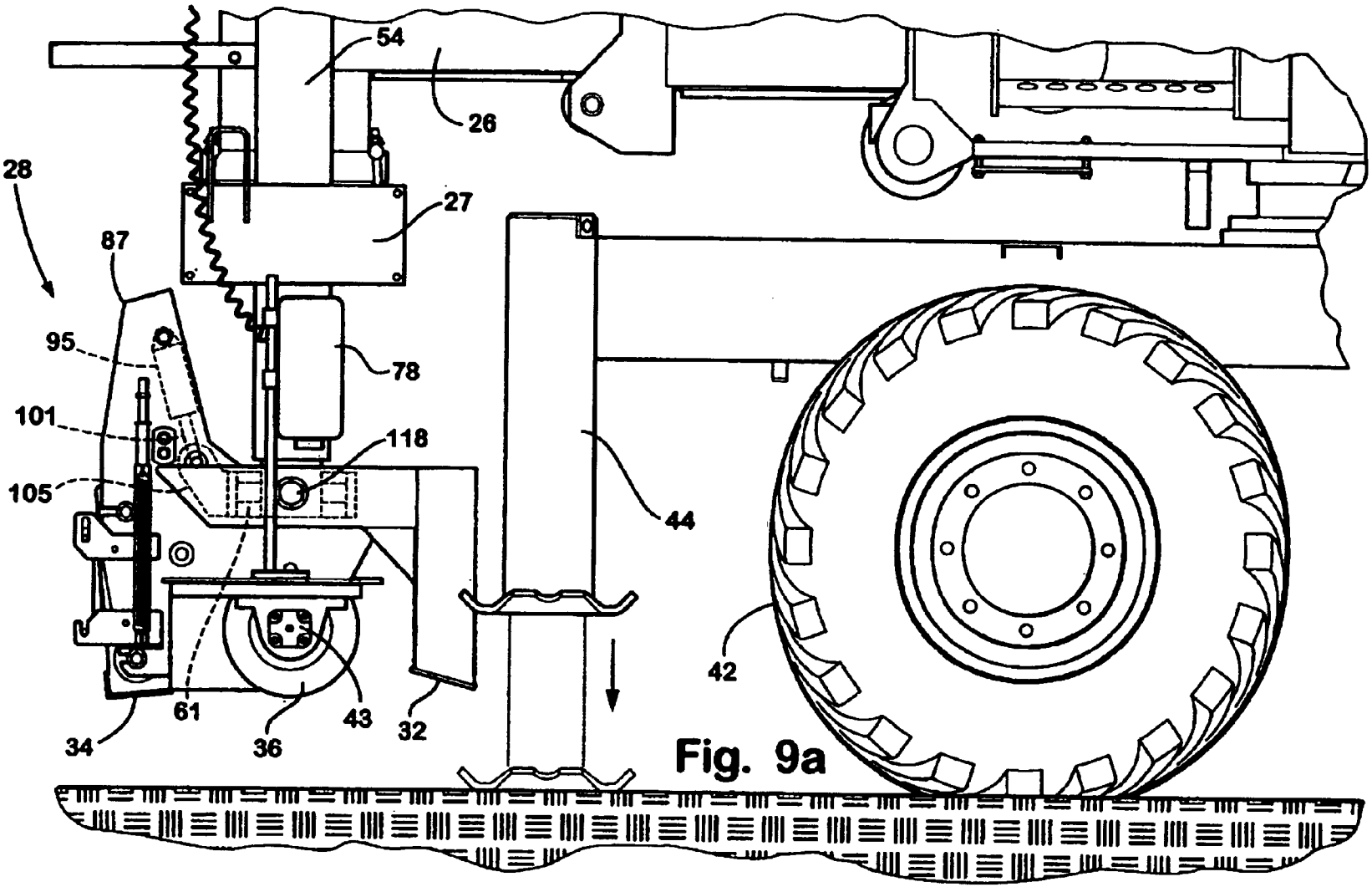
FIG. 9a is an enlarged, fragmentary, elevational view of the contouring assembly of the present invention depicted in an unrotated orientation.
Figure 9B:
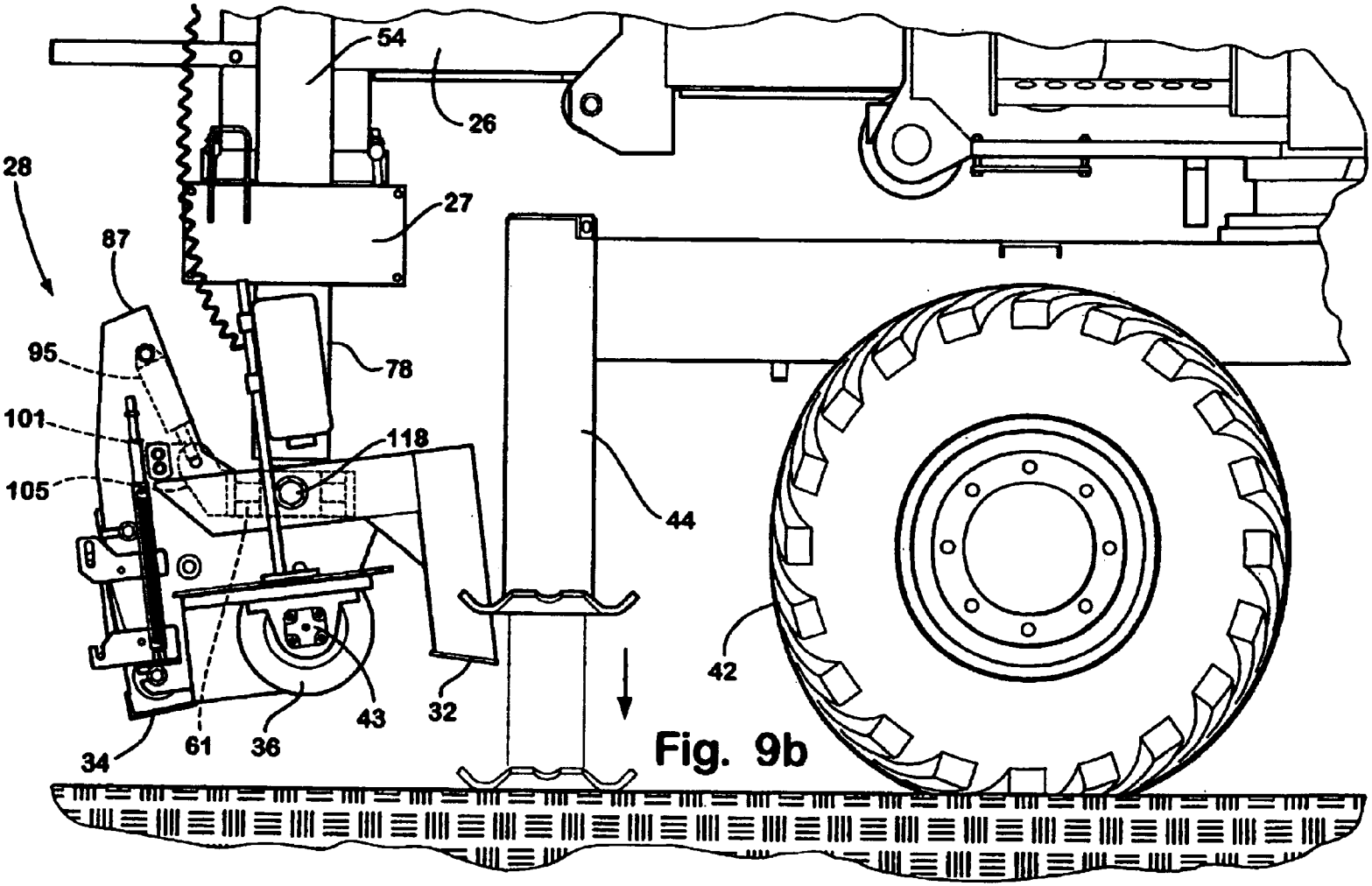
FIG. 9b is an enlarged, fragmentary, elevational view of the contouring assembly depicted as rotated in a counterclockwise orientation.
Figure 9C:
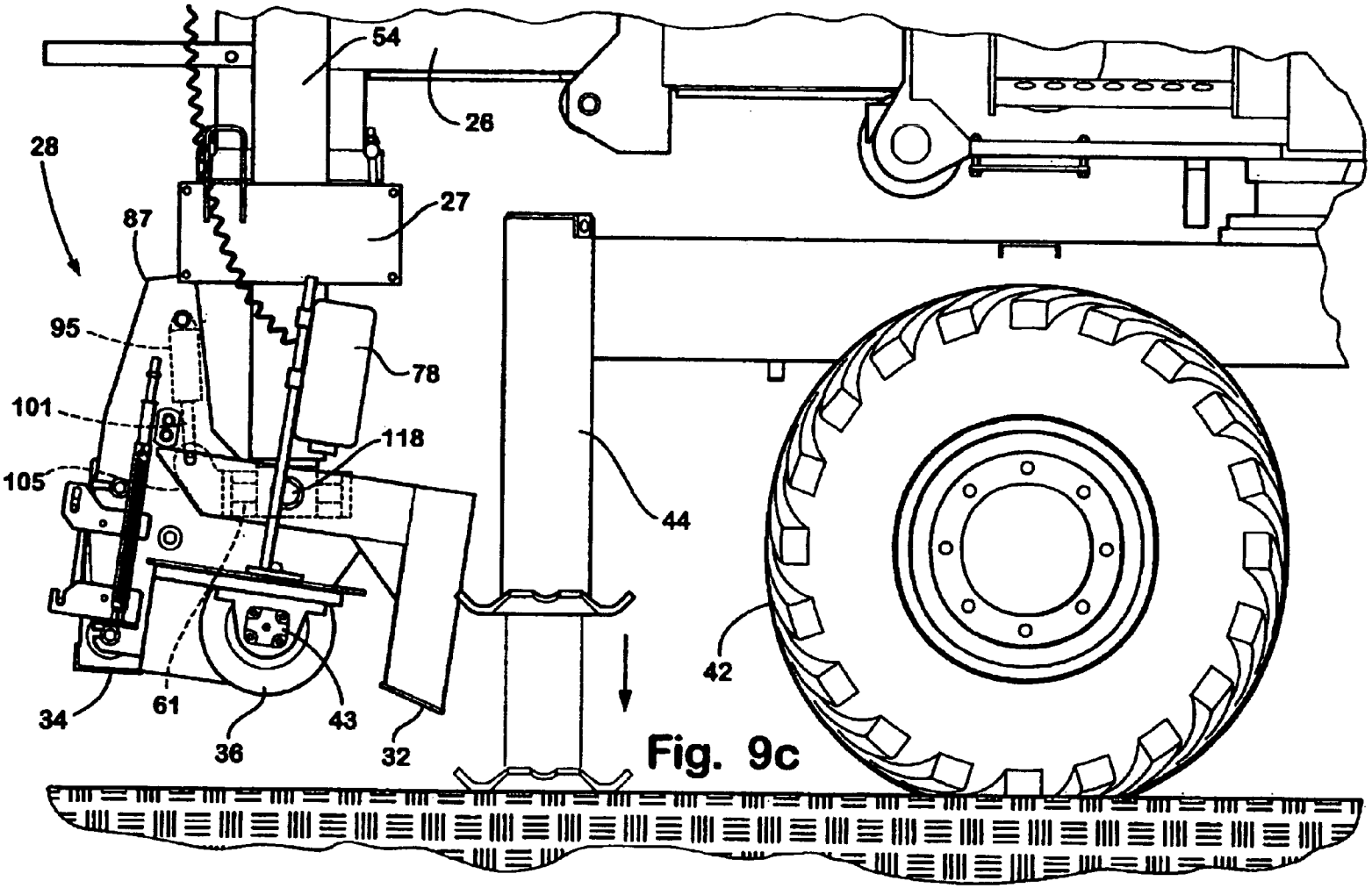
FIG. 9c is an enlarged, fragmentary, elevational view of the contouring assembly depicted as rotated in a clockwise direction.

The present invention will now be described with reference to the accompanying drawings wherein like reference numerals correspond to like elements in the several drawings. A contouring device or machine 20 according to the present invention is depicted in FIG. 1. Contouring machine 20 includes a base 22 upon which an operator 24 controls contouring machine 20. Base 22 includes a platform 38 upon which an upper frame 40 is rotatably mounted. Base 22 can be moved to any desired location by wheels 42 which are powered by a motor onboard base 22. Platform 38 is securely planted at a desired location by four stabilized legs 44 that are retractable when contouring machine 20 is driven to different locations. A boom 26 is telescopingly mounted on a front end of upper frame 40. A support beam 27 is affixed to boom 26 at an end opposite upper frame 40. A contouring member preferably includes a contouring assembly 28 mounted on support 27 by way of a right and left hydraulic cylinder 52 and 54, respectively. Hydraulic cylinders 52 and 54 independently raise and lower the respective ends of contouring assembly 28 with respect to support 27. Other than the controls for independently controlling the individual ends of contouring assembly 28 and tilting it about an axis as depicted in FIGS. 9a–c, the structure of contouring machine 20 is the same as that disclosed in commonly assigned U.S. Pat. No. 4,930,935 issued to Quenzi et al., and which is incorporated herein by reference.

Figure 2:
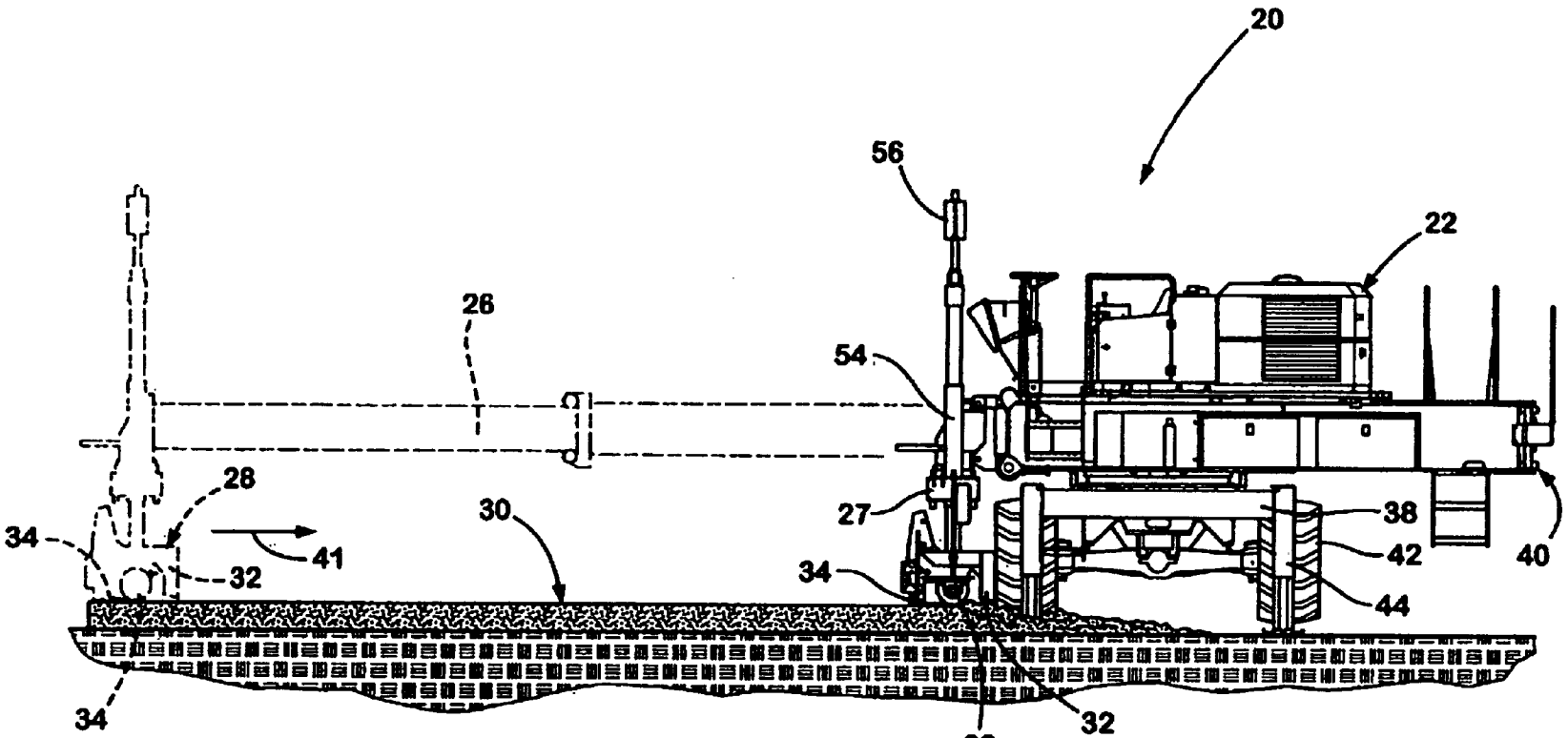
FIG. 2 is an elevational view of the contouring device of FIG. 1 illustrating the movement of a boom in phantom.
Figure 3:
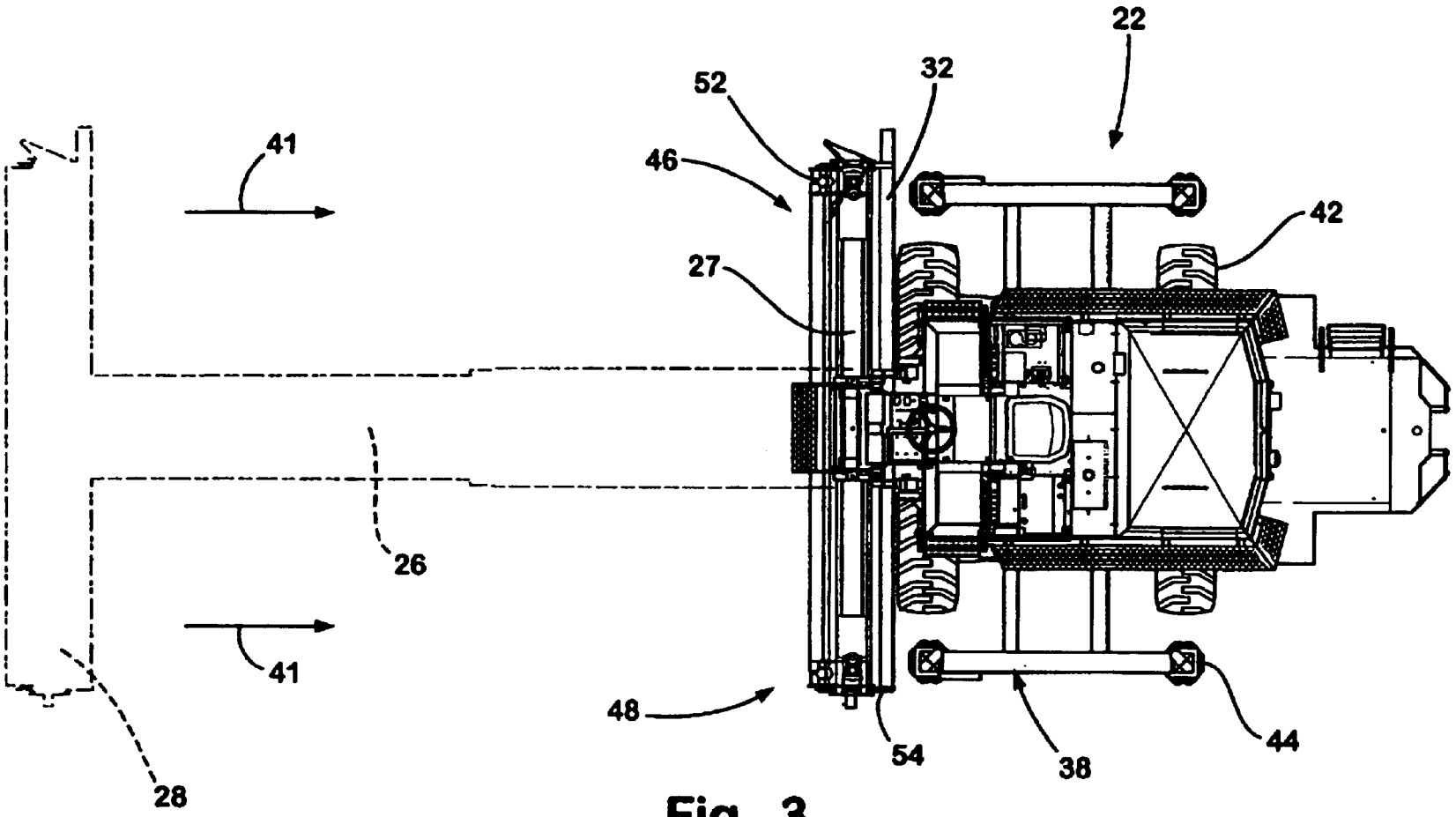
FIG. 3 is a plan view of the contouring device of FIG. 1 illustrating the movement of the boom in phantom.
Figure 4:
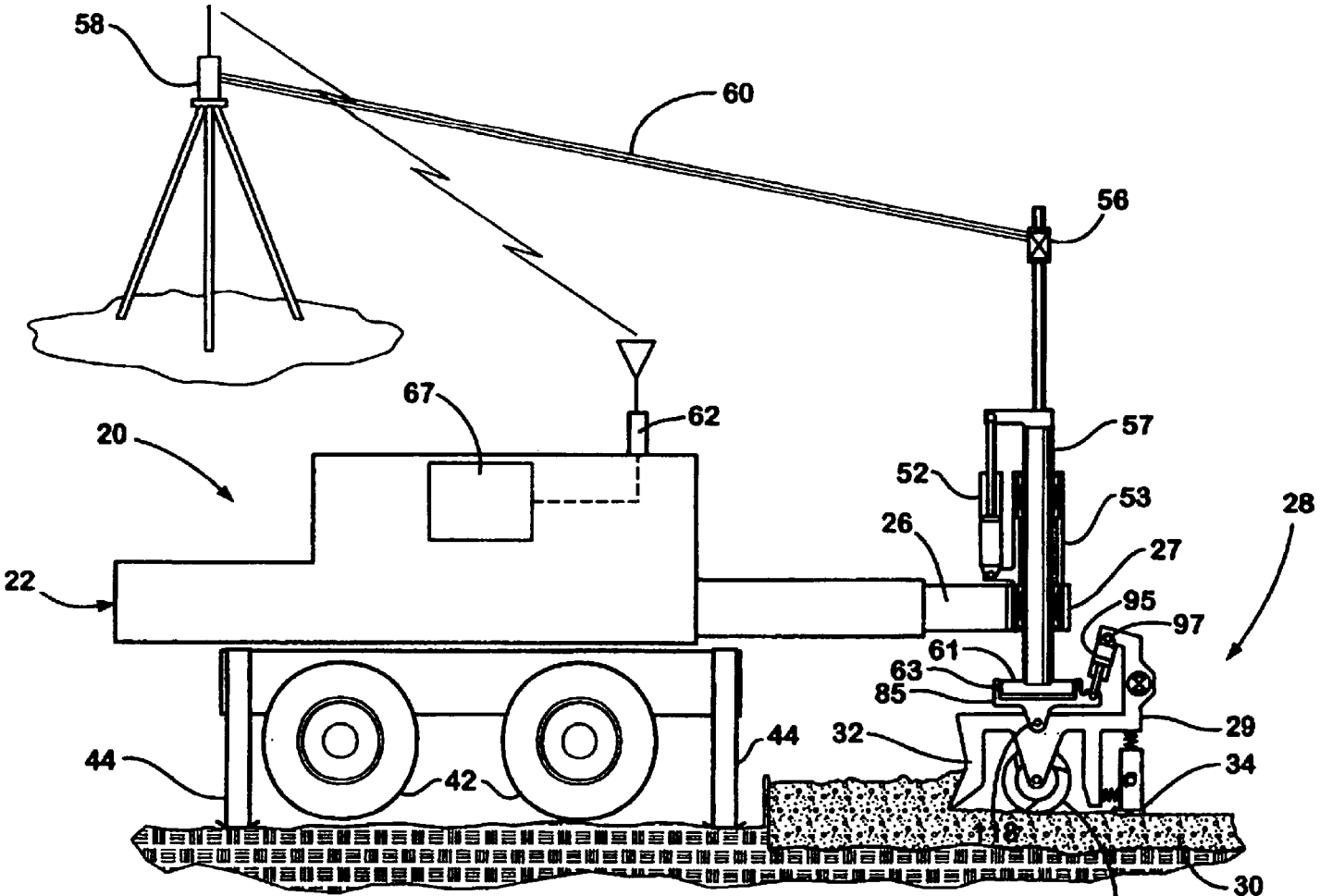
FIG. 4 is a schematic illustration of the contouring device and tracking device.

When contouring machine 20 is to be used to contour a surface, it is positioned adjacent an area of raw material 30 which is to be contoured (FIGS. 2 and 3). For purposes of discussion hereafter, it will be assumed that material 30 is freshly poured, uncured concrete, and that the contouring machine includes a screed or contouring unit or member adapted for spreading, distributing, smoothing, leveling and/or grading such uncured concrete. This assumption is for purposes of discussion only, and it will be understood that material 30 can be any of a variety of other loose, gradable materials, such as dirt, sand, or earth. It will also be further understood that contouring machine 20 can be used to smooth material 30 to have a one, two, or three dimensional surface. The contouring member could also be a blade or other earth moving or material moving device. In operation, the boom 26 is extended away from upper frame 40. Preferably, concrete 30 is deposited in the area to be contoured prior to boom 26 being extended. Thereafter, boom 26 is extended over the poured concrete without contacting the concrete. The boom is then retracted toward and into upper frame 40 while contouring assembly 28 contours the uncured concrete 30 as boom 26 is retracted. Alternately, machine 20 can be moved through the concrete, or other material, as set forth in Quenzi U.S. Pat. No. 4,930,935.

Contouring assembly 28 includes a right and left side 46 and 48, respectively, as viewed from operator position 24 (FIGS. 1–3). Support 27 extends between right and left sides of contouring assembly 28. Right hydraulic cylinder 52 is mounted at right end 46 of support 27 and adjustably raises and lowers right side 46 of contouring assembly 28 with respect to support 27. Left hydraulic cylinder 54 is mounted on left side 48 of support 27 and adjustably raises and lowers left side 48 of contouring assembly 28 with respect to support 27. By independently controlling right hydraulic cylinder 52 and left hydraulic cylinder 54, the cross slope of contouring assembly 28 can be adjusted as desired in a plane transverse to the direction of motion of contouring assembly 28 when boom 26 is retracted. By adjusting the cross slope of contouring assembly 28, a three dimensional curved surface can be produced over a given large area by contouring machine 20. Alternatively, by adjusting the height of right and left sides 46 and 48 of contouring assembly 28 uniformly, a one or two dimensional surface can be created.

Contouring assembly 28 preferably includes one or more of a plow 32, a vibrating screed or contouring beam 34, and a rotating auger 36 (FIGS. 1, 2, 7 and 9a–9c). Plow 32, screed 34, and auger 36 all extend generally parallel to each other and are oriented transverse to the direction of motion of contouring assembly 28 as it is extended and retracted by boom 26. Plow 32, auger 36, and screed 34 are all mounted on a center beam 29 that extends parallel to plow 32, auger 36 and screed 34. Plow 32 is positioned on a leading side 41 of contouring assembly 28 (when boom 26 is being retracted) and serves to push excess concrete away from auger 36 and vibrating screed 34 while also determining the initial grade for the concrete or other material 30. Auger 36 is positioned between plow 32 and vibrating screed 34 and extends downwardly approximately ¾ of an inch further than plow 32. A motor 43 attached at left side 48 of center beam 29 rotates auger 36. Auger 36 rotates and moves the excess concrete or material 30 in a direction from left side 48 toward right side 46, although motion in the opposite direction from right side 46 to left side 48 could also be used. Vibrating screed or contouring beam 34 is located adjacent auger 36. Vibrating screed 34 is constructed to vibrate by way of an eccentrically weighted motor system as disclosed in commonly assigned U.S. Pat. No. 4,930,935, and smooths the uncured concrete as it passes over the area to be contoured, after plow 32 and auger 36 have removed excess concrete and spread and distributed the concrete generally evenly across the path of travel of assembly 28. Screed 34 extends downwardly approximately ¼ of an inch farther than auger 36.

Leveler assembly 28 can also include, if desired, an oscillating engaging member (not shown) of the type described and disclosed in commonly assigned, copending application entitled SCREEDING APPARATUS AND METHOD INCORPORATING OSCILLATING ATTACHMENT, filed Mar. 31, 1998, which is incorporated herein by reference. As described therein, an oscillating engaging member is located between auger 36 and screed 34 and oriented generally parallel thereto. The oscillating member oscillates in its longitudinal direction, parallel to contouring assembly 28, and further serves to smooth and distribute the concrete prior to the final leveling of screed 34.

A target 56 is located atop right hydraulic cylinder 52 (FIGS. 1–5). Target 56 comprises an infrared heat source and comer-cube laser reflecting mirror. The position of target 56 is tracked by an infrared tracking device 58 (FIGS. 4–5) as contouring assembly 28 is moved over the surface to be contoured. In the currently preferred embodiment, tracking device 58 emits a laser beam 60 that is reflected by target 56 back to tracking device 58. From the reflected beam, tracking device 58 computes the distance between itself and target 56. Tracking device 58 further includes servo motors and infrared sensors which control the orientation of emitted laser beam 60 such that it will follow (i.e. track) target 56 wherever it is moved. From the distance measured to target 56 and the angles measured by tracking device 58 at which laser beam 60 is emitted from tracking device 58, tracking device 58 is able to calculate the position of target 56 in three dimensions (e.g. X, Y, and Z) from a known reference point.

Tracking device 58 further includes a radio transmitter that transmits the measured position of target 56 to a receiver 62 on base 22. In the currently preferred embodiment, tracking device 58 provides an updated measurement of the position of target 56 approximately four times every second. This frequency of position measurement updating has been found to be sufficient in the current embodiment. Other frequencies can, of course, be used. Tracking device 58 is a commercially available device, such as automatic tracking system-machine control (ATS-MC) available from Geotronics/Spectra-Precision of Dayton, Ohio, and the internal structure will not be described further herein. Target 56 is a combination corner cube laser reflector and infrared heat source which is also commercially available in conjunction with tracking device 58. An acceptable target for carrying out the present invention is manufactured by Geotronics/Spectra Precision from Dayton, Ohio, under model No. Tracker Target (RMT 360). Other commercially available tracking and target measurement systems may also be acceptable.

The position of target 56 as measured by tracking device 58 is transmitted through a radio modem 64 (FIG. 5) to a control system 55 for controlling right side 46 of contouring assembly 28. Control system 55 receives the transmitted position information at a second radio modem 66 on contouring machine 20. Radio modem 66 communicates the position information through a communications port 68 which forwards the position information to a tracking processor 70. Tracking processor 70 takes the received position information from tracking device 58 and translates the position information from tracking device 58's frame of reference to the site frame of reference. Tracking device 58 only measures position information with respect to itself, and processor 70 converts this into position information with respect to the site to be leveled. The translation of coordinate frames of reference is based upon an initialization procedure undertaken prior to contouring, which is described more fully below. Tracking processor 70 outputs the translated position information (X, Y, and Z) to a main processor 72. Main processor 72 has access to the profile of the desired shape of the surface to be contoured stored in some form of memory, such as RAM (not shown). Main processor 72 compares the translated position information received from tracking processor 70 with the coordinate information of the stored profile of the surface to be contoured. Main processor 72 then calculates the difference in the measured height (Z axis) of right side 46 of contouring assembly 28 and the corresponding desired height (Z axis) in the stored profile. As an example, if tracking processor 70 transmits to main processor 72 measured location information of X=10, Y=15, and Z=5, main processor 72 will search the stored profile for the stored Z coordinate (height) at the location X=10 and Y=15. Main processor 72 will then compare the Z coordinate (height coordinate) stored in memory with the measured Z axis coordinate received from tracking processor 70. The difference between these two Z axis coordinates represents an error of the height of right side 46 of contouring assembly 28. In this example, if the stored Z axis coordinate at X=10 and Y=15 is 3, then the error signal will be 2.

Figure 5:
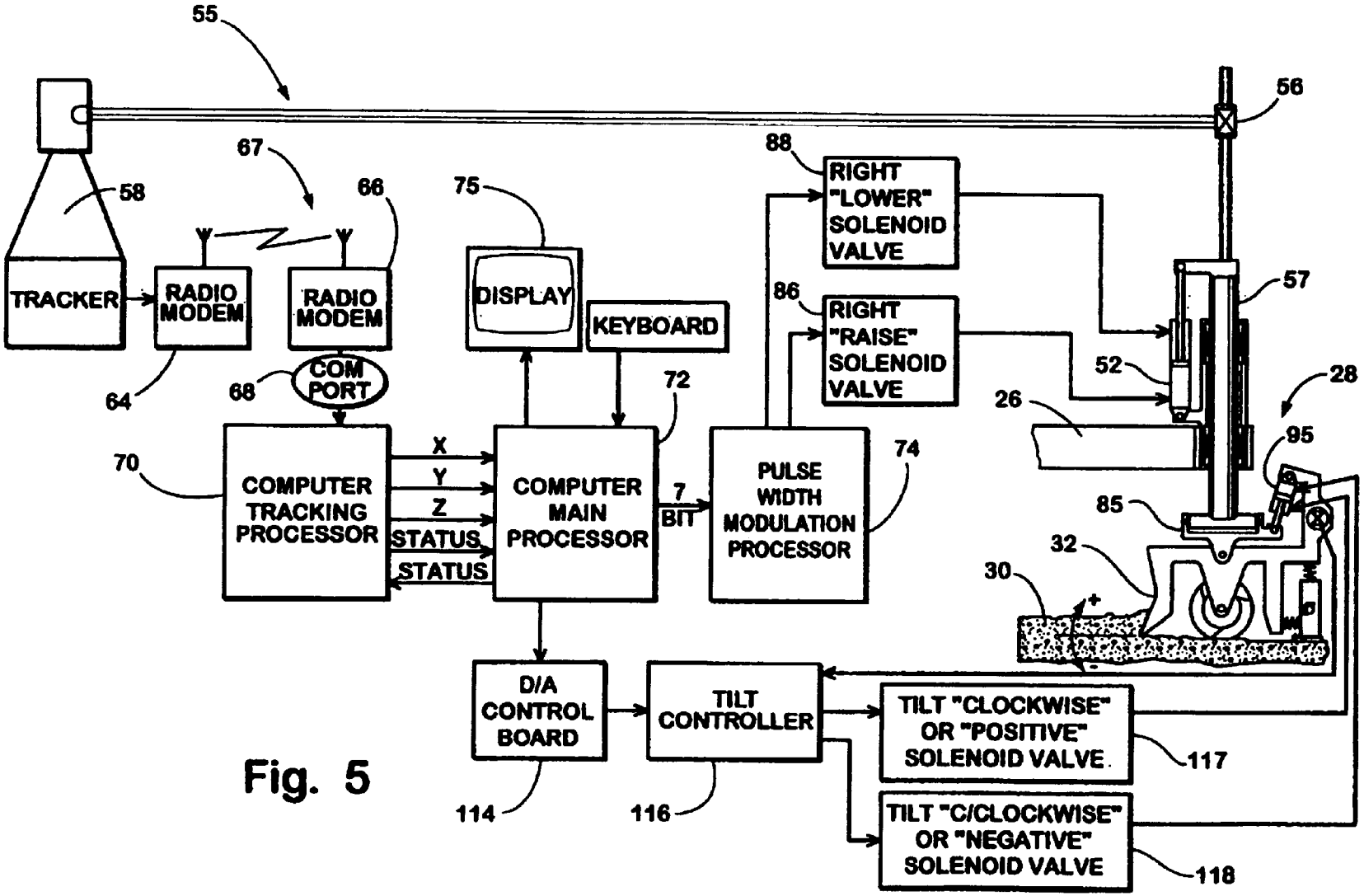
FIG. 5 is a block diagram of a control system for controlling a first end of a contouring assembly on the contouring device.
Figure 6:
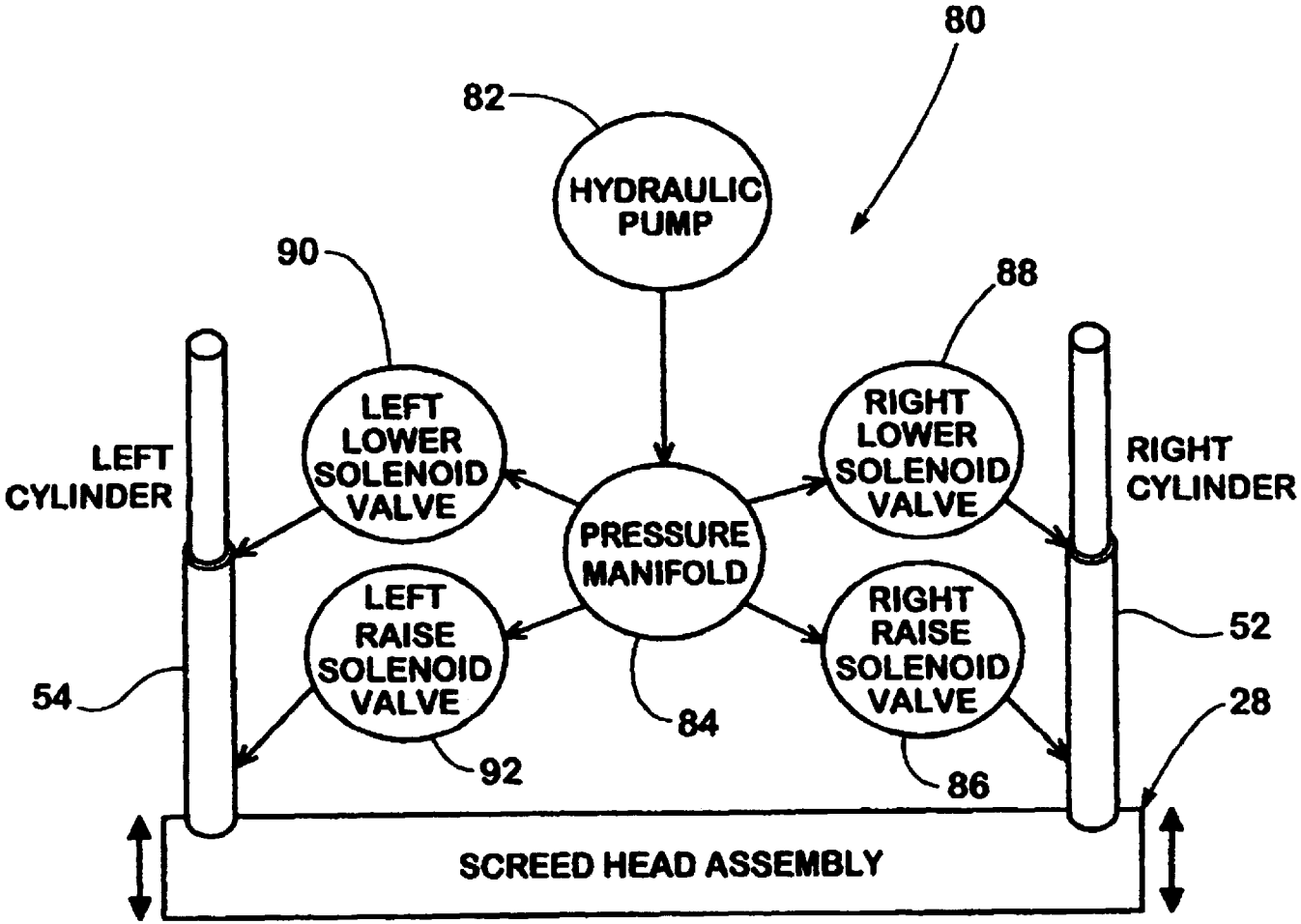
FIG. 6 is a block diagram of a hydraulic control system for the contouring assembly.

Main processor 72 transmits the error signal to a pulse width modulated processor 74. Pulse width modulated processor 74 generates a pulse width modulated signal that is proportional to the error signal it received from main processor 72. The pulse width modulated signal is output to one of two solenoid valves 86 and 88 that control right hydraulic cylinder 52 (FIGS. 5–6). Solenoid valves 86 and 88 control oil flow in hydraulic system 80 of contouring machine 20. The height of right side 46 of contouring assembly 28 is thereby adjusted to currently correspond to the stored profile of the surface to be contoured. The control of right hydraulic cylinder 52 is independent of the control of left hydraulic cylinder 54, which is described below.

Right and left hydraulic cylinders 52 and 54 are controlled by a single hydraulic system 80 illustrated in FIG. 6. Hydraulic system 80 includes a hydraulic pump 82 and a manifold 84 that branches out to right and left hydraulic cylinders 52 and 54. A right raise solenoid valve 86 controls the flow of hydraulic fluid to right cylinder 52 such that right cylinder 52 is raised. Right lower solenoid valve 88 controls the flow of hydraulic fluid to right cylinder 52 such that right cylinder 52 is lowered. Left lower solenoid valve 90 and left raise solenoid valve 92 similarly control the lowering and raising of left hydraulic cylinder 54, respectively. As described above, right solenoid valves 86 and 88 are controlled by a control system 55 depicted in FIG. 5. Left solenoid valves 90 and 92 are controlled based upon the output of a distance measuring sensor 78, described below. Solenoid valves 86, 88, 90, 92 may be any of conventional solenoid operated, hydraulic valves which are electrically operated to either fully open or fully close. Alternately, valves 86, 88, 90, 92 may be proportional hydraulic valves which variably adjust between fully open and fully closed positions in proportion to the electrical voltage applied.

Left hydraulic cylinder 54 is controlled by a separate control system than that used to control right hydraulic cylinder 52. Left hydraulic cylinder 54 is controlled based upon a distance detected by a proximity sensor or distance measuring sensor 78 attached at left side 48 of contouring assembly 28 (FIGS. 1, 2, and 9a–9c). Distance measuring sensor 78 measures its vertical distance above whatever reference surface or form it is located over. Typically the distance measuring sensor 78 will be located above a previously contoured section of concrete. However, distance measuring sensor 78 may alternatively be positioned over any of a variety of different preset physical forms. In either case, distance measuring sensor 78 will provide a signal representing its distance from the surface below it. The signal provided by distance measuring sensor 78 is communicated to a separate controller (not shown) that adjusts the height of left side 48 of contouring assembly 28 in order to maintain in at a desired height. The controller for left side 48 of contouring assembly 28 adjusts the height of left side 48 by controlling left hydraulic cylinder 54. Distance measuring sensor 78, along with its associated controller, ensures that the surface contoured by contouring machine 20 will smoothly correspond to a previously contoured surface to the left of and adjacent to the surface currently being contoured. In the currently preferred embodiment, distance measuring sensor 78 is an ultrasonic sensor, which may be of the type sold by Spectra-Physics of Dayton, Ohio under model no. ST2-20. It will be understood, however, that distance measuring sensor 78 can be any of a variety of different technology based sensors, such as laser sensors, mechanical sensors, or other types.

Figure 7:
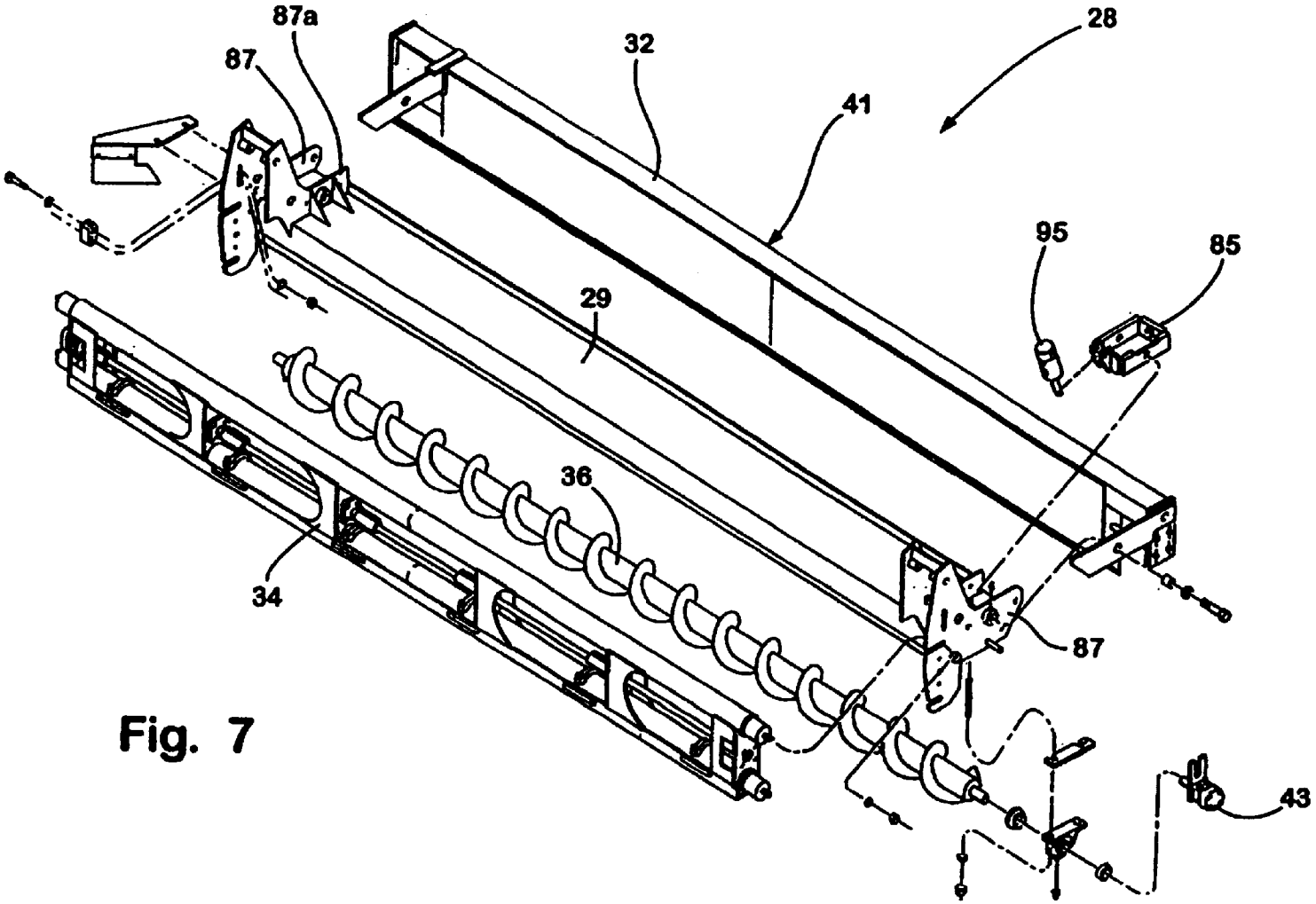
FIG. 7 is an exploded, perspective view of the contouring assembly.
Figure 8:
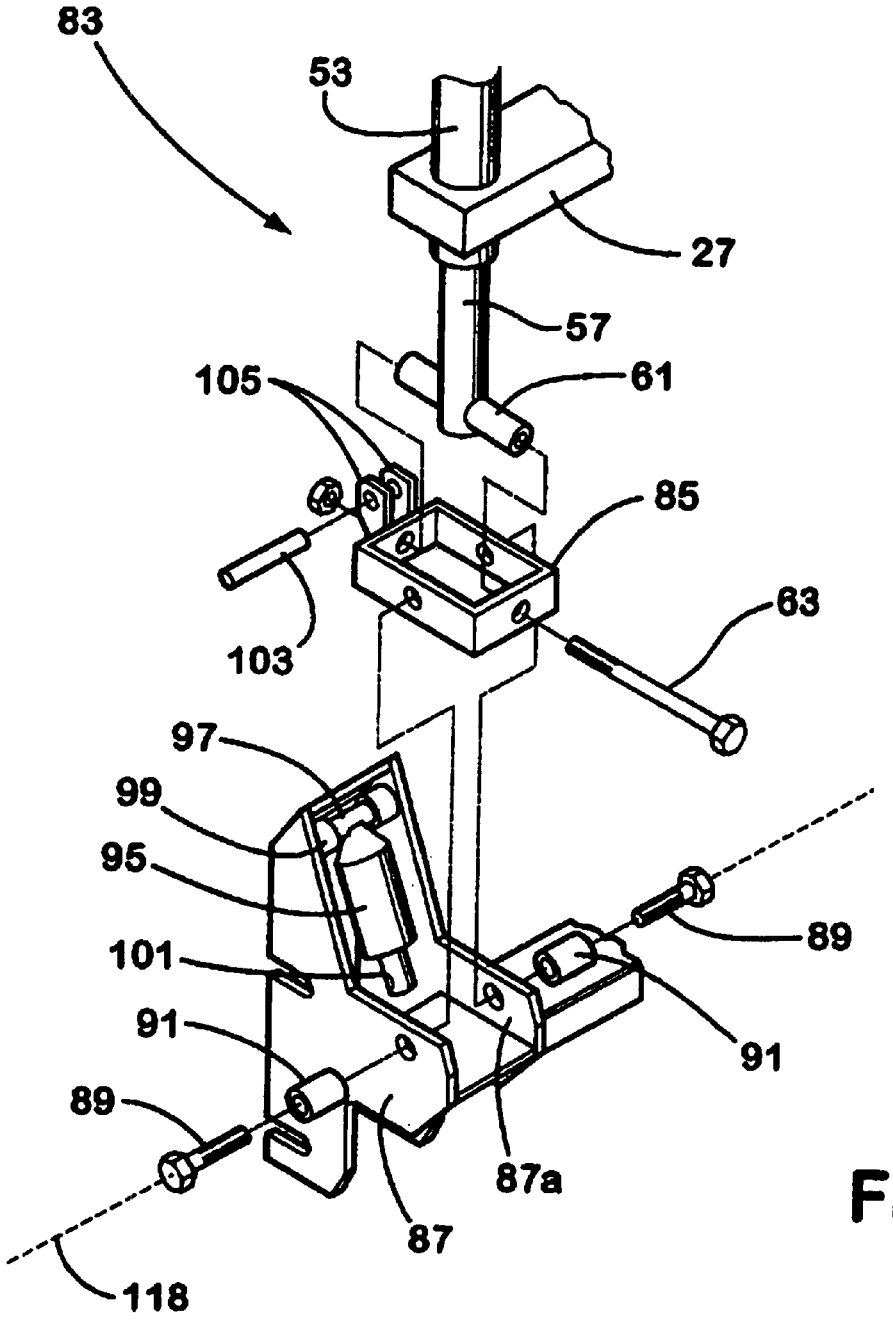
FIG. 8 is an enlarged, fragmentary, perspective, exploded view of a tilting assembly for tilting the contouring assembly.

As best seen in FIG. 8, contouring assembly 28 is preferably pivotally mounted about a pair of orthogonal pivot axes at each end of the contouring assembly 28 with respect to support beam 27 by means of a tilting assembly 83. The mechanical structure for tilting contouring assembly 28 is the same as that disclosed in commonly assigned U.S. Pat. No. 4,930,935 issued to Quenzi et al. Each tilting assembly 83 includes a rectangular pivot yoke 85 that is fitted between laterally spaced portions of a pair of end plates 87, 87a and that is secured for pivotal movement in a vertical plane on a generally horizontal axis 118 extending parallel to the direction of elongation of the contouring assembly 28 by means of securing bolts 89 and bushings 91 passing through end plates 87, 87a and pivot yoke 85 (FIGS. 7 and 8). A hydraulic fluid cylinder 95 is pivotally secured to the upright end plates 87, 87a by means of a laterally extending pivot axle 97 secured to one end of the cylinder and pivotally mounted in bushings 99 extending inwardly from end plates 87, 87a. A cylinder rod 101 extends from the opposite end of fluid cylinder 95 and is secured by a pivot pin 103 between a pair of spaced upright plates 105 which are rigidly secured to one end of pivot yoke 85. The horizontal pivot axis 118 provided by yoke 85 and bolts and bushings 89, 91 is vertically aligned and centered above the rotational axis of auger 36. Accordingly, operation of the fluid cylinder 95 to retract cylinder rod 101 causes counterclockwise rotation of the contouring assembly 28 about axis 118 on bolts and bushings 89, 91 as shown in FIG. 9b, thereby raising plow 32 and lowering vibratory screed 34 (Step 119 of FIG. 5). Extending cylinder rod 101 raises vibratory screed 34 and lowers plow 32 by causing clockwise rotation around horizontal pivot axis 118 (Step 117 of FIG. 5; FIG. 9c). In either case, since the rotational auger 36 is vertically aligned with the pivot axis 118, rotation via fluid cylinder 95 causes little variation in the position or height of rotational auger 36. Accurate positioning of plow 32 ahead of auger 36 and vibratory screed 34 prevents "tearing" of the concrete surface which could otherwise occur if the plow 32 followed the auger 36. "Tearing" of the smoothed, contoured surface is also prevented by maintaining a constant vertical relationship between plow 32, auger 36, and vibratory screed 34 despite any deflection of boom 26 caused by gravity or sloped working surfaces. Contouring machine 20 can also be equipped with a self-leveling system such as that disclosed in commonly assigned U.S. Pat. No. 4,930,935. The self-leveling system is employed when an essentially flat surface is to be smoothed.

It will be understood that alternate power sources other than cylinders 95 may be substituted to rotate contouring assembly 28 on axis 118 such as hydraulic motors that rotate threaded rods which engage pivotable members on yokes 85.

Contouring assembly 28 is mounted on a rectilinear leveler assembly support beam 27 secured to the underside of boom 26 such that support beam 27 extends parallel to the axial extent of contouring assembly 28 (FIG. 8). At left and right sides of support 27, right and left hydraulic cylinders 52 and 54 are respectively mounted. Each hydraulic cylinder includes a vertically extending cylinder tube 53 through which is slidably mounted an inner elevation tube 57 on bearings pressed inside tube 53. The lower end of each inner elevation tube 57 includes a tubular pivot foot 61 (FIG. 8) which is slightly smaller than the internal lengthwise dimension of pivot yoke 85 such that it may be pivotally secured inside yoke 85 by a pivot bolt 63. Pivot bolt 63 passes through the yoke in a direction perpendicular to the horizontal direction of elongation of contouring assembly 28 and the horizontal pivot axis 118 provided by bolts 89 and bushings 91 described above. Pivot bolts 63 at either end of the contouring assembly on elevation tubes 57 allow the lateral tilt of the contouring assembly to be adjusted by raising and lowering tubes 57. Thus, the lateral incline or slope of support beam 27, and thus plow 32, auger 36, and vibratory screed 34 mounted thereon may be adjusted with respect to beam 27 to various slopes and ground contours, thereby permitting contouring of a three dimensionally curved surface over a relatively large area.

OPERATION OF CONTOURING MACHINE 20

Figure 10A:
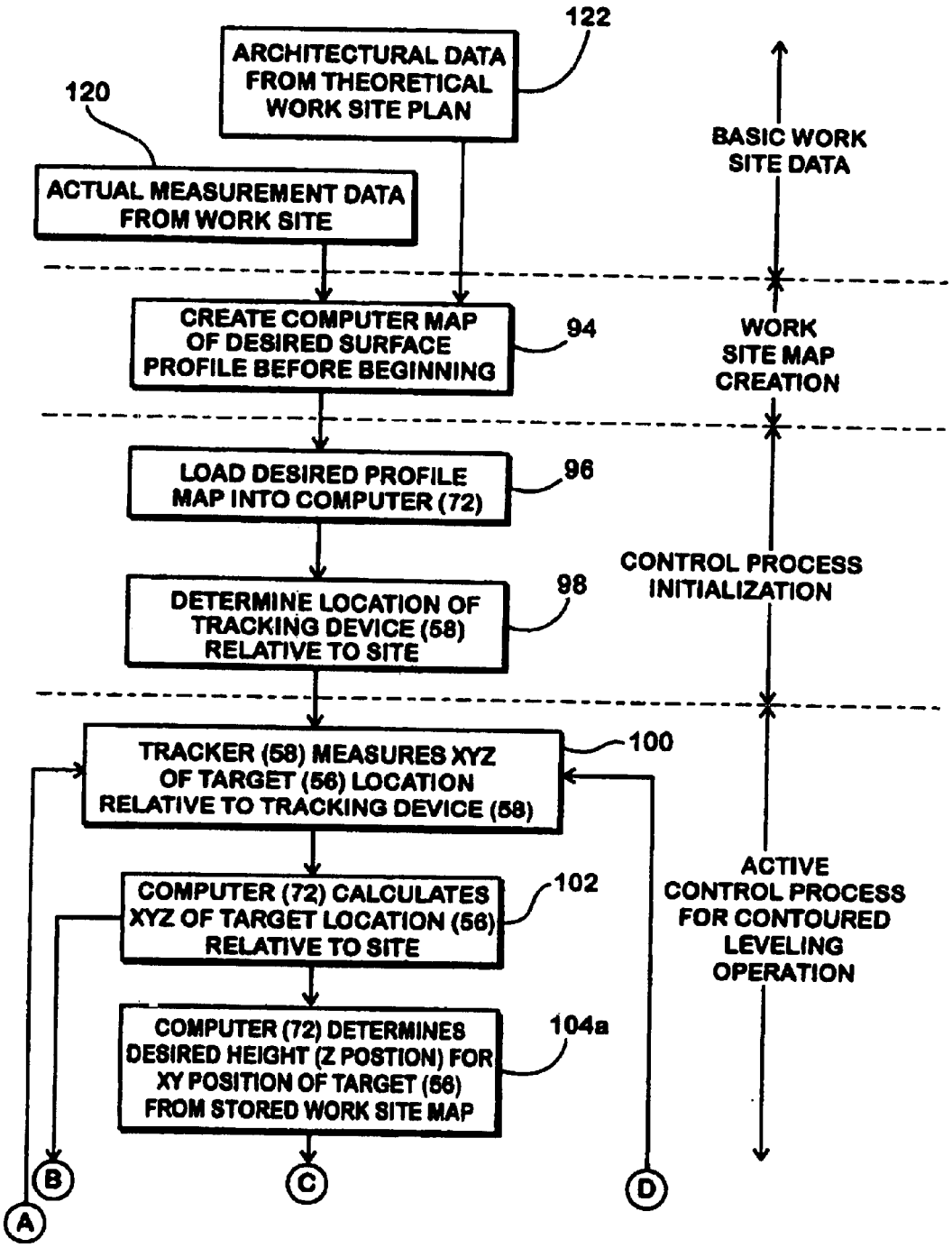
FIG. 10 is a flowchart illustrating the method of the present invention for contouring a three dimensional surface.
Figure 10B:
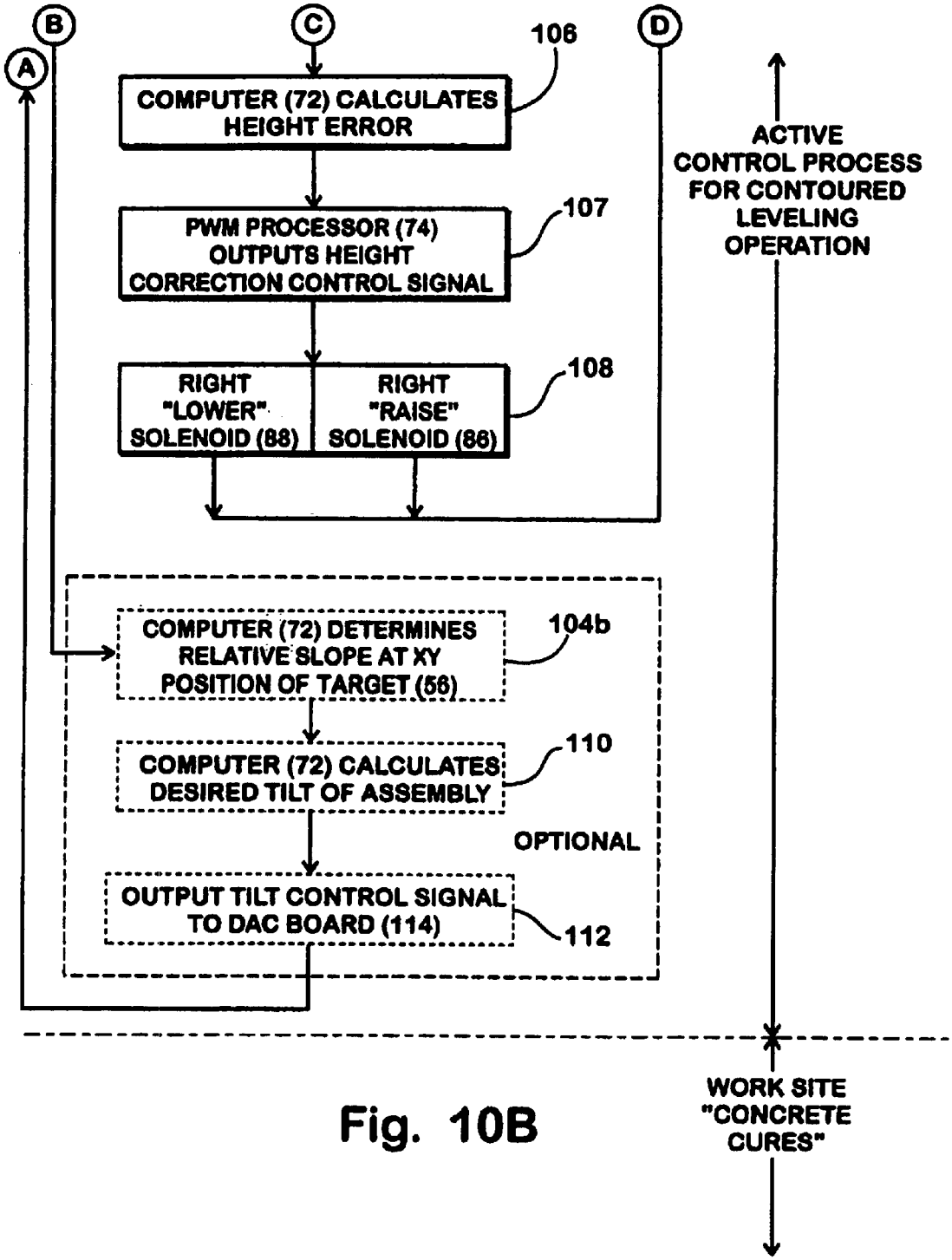

The steps of operation of contouring machine 20 are depicted in FIG. 10 in flowchart form. An initial step 94 requires the creation of a computer map of the desired surface profile to be contoured. The surface profile information can be taken from either actual measurement data from the work site (step 120), or it may be based on architectural data from a theoretical work site plan (step 122). Regardless of its source, the surface profile map is then loaded and stored in a computer on board the contouring machine 20 during an initial step 96. An example of the general algorithm for creating this profile is described below, although it will be understood that a variety of different algorithms may be used within the scope of the invention.

In initialization step 98, the location of tracking device 58 with respect to the site is determined (FIG. 10). Initialization step 98 is required because tracking device 58 can be positioned anywhere within approximately a one mile radius in sight of the surface to be contoured. Without knowing the position of tracking device 58 relative to the site, the position information transmitted from tracking device 58 would be of no value to contouring machine 20. Therefore, the position of tracking device 58 must be determined relative to the work site. While initialization step 98 can be done in a variety of ways, one acceptable way is to carry a portable target 56A (not shown) to several known site locations and read and record the measurements produced by tracking device 58. By taking at least three such measurements, the correlation between the tracking device 58 frame of reference and the work site frame of reference can be established.

After initialization, the retraction of boom 26 begins the movement of contouring assembly 28 over the area to be contoured. As contouring assembly 28 moves over the surface to be contoured, the three dimensional location (i.e. X, Y, and Z) of target 56 is continuously measured by tracking device 58 (step 100) (FIG. 10). The position of target 56 relative to tracking device 58 is transmitted to tracking processor 70 where this position information is translated to the frame of reference of the site (step 102). The translation of step 102 is based upon the information obtained during initialization step 98. At step 104, main processor 72 looks up the height (Z value) of the stored profile corresponding to the X,Y location of target 56 as determined by tracking device 58. From the stored work site map profile, main processor 72 determines what Z value target 56 should be at for that X, Y location. Main processor 72 then compares the desired Z value from the stored profile with the measured Z value transmitted from tracking device 58.

At step 106 (FIG. 10) main processor 72 calculates a height error signal, which is the difference between the desired Z value from the stored work site map profile and the measured Z value from tracking device 58. The error signal is transmitted from main processor 72 to pulse width modulated processor 74. At step 107 pulse width modulated processor 74 computes a pulse width modulated control signal that is transmitted to either right raise solenoid valve 86 or right lower solenoid valve 88, depending upon the sign of the error signal. The width of the pulse width modulated signal corresponds to the magnitude of the error signal calculated by main processor 72. The width of the pulse width modulated signal is also dependent upon the sign of the error signal calculated by main processor 72 because different volumes of hydraulic fluid have to be metered depending upon which direction (up piston side or down rod side) of right hydraulic cylinder 52 is to be moved. The up or down movement of right hydraulic cylinder 52 moves right side 46 of contouring assembly 28 up or down independently of left side 48. Contouring machine 20 is thereby capable of not only contouring flat surfaces, but also approximating three dimensionally curved surfaces.

In addition to the vertical adjustability of contouring assembly 28 via hydraulic cylinders 52 and 54, contouring assembly 28 can also be pivoted or tilted about an axis 118, as discussed previously (FIGS. 9a–9c). After step 102, the tilt (i.e. pitch) of contouring assembly 28 is optionally adjusted based on the stored work site map profile of the surface to be contoured (FIG. 10). The control of the tilt of contouring assembly 28 is optionally performed in steps 104B, 110, and 112 by computer 72. Steps 104B, 110, and 112 are optional because contouring machine 20, in one embodiment, may not include the ability to tilt contouring assembly 28. In step 104B, computer 72 determines the actual slope of contouring assembly 28 relative to the work site. The determination of the actual slope of contouring assembly 28 by computer 72 can be accomplished by any of a variety of known sensors for measuring tilt. In step 110 main processor 72 calculates the slope of the stored profile for the current location of target 56. At step 112, main processor 72 outputs a digital tilt control signal to a DAC (Digital to Analog Conversion) board 114, which converts the digital signal to an analog signal in the current embodiment of this invention. DAC board 114 then passes the analog tilt control signal on to a tilt controller 116 (FIG. 5). The tilt control signal alters the tilt of contouring assembly 28 as illustrated in FIGS. 9a–9c. If the slope of the stored profile is horizontal, contouring assembly 28 is not tilted, as illustrated in FIG. 9a. If the slope of the stored profile is positive in the direction that contouring assembly 28 moves, contouring assembly 28 is rotated counterclockwise (positive slope) as illustrated in FIG. 9b. The extent of rotation corresponds to the slope of the stored profile. If the stored profile is sloping in an opposite direction, contouring assembly 28 is tilted in a clockwise direction (negative slope), as illustrated in FIG. 9c. Again, the degree of rotation corresponds to the slope of the stored profile. The tilting of contouring assembly 28 allows contouring machine 20 to smooth a surface that more accurately corresponds to the desired profile.

Tracking profile 70, in addition to performing frame of reference translations, monitors the received transmissions from tracking device 58. If tracking processor 70 does not receive a transmission from tracking device 58 for a time exceeding 2 to 5 seconds, tracking processor 70 concludes that tracking device 58 has lost track of target 56. Tracking device 70 outputs a corrective signal instructing tracking device 58 to switch into a search mode. The corrective signal passes through communications port 68 to radio modem 66 where it is transmitted by radio to tracking device 58. When tracking device receives the corrective signal, it switches to a search mode. In the search mode, tracking device 58 moves an infrared sensor "eye" (not shown) over the area where target 56 was last detected in an effort to relocate target 56 and its infrared heat source. The search mode is part of the commercially available tracking devices that are suitable for use in the present invention. The algorithm used to control the movement of laser beam 60 when tracking device 58 is in the search mode can be altered from that built into the commercially available tracking devices, if desired. If tracking device 58 does not relocate target 56 in the search mode, tracking processor 70 sends a signal to main processor 72. The signal can either cause the retraction of boom 26 to stop automatically, or it can display a message on a display indicating the target has not yet been found allowing the operator to manually take appropriate action. If tracking device 58 does relocate target 56 within the allotted time, tracking device 58 switches out of the search mode and resumes its normal operation of tracking and transmitting the position of target 56 to tracking processor 70.

Figure 11:
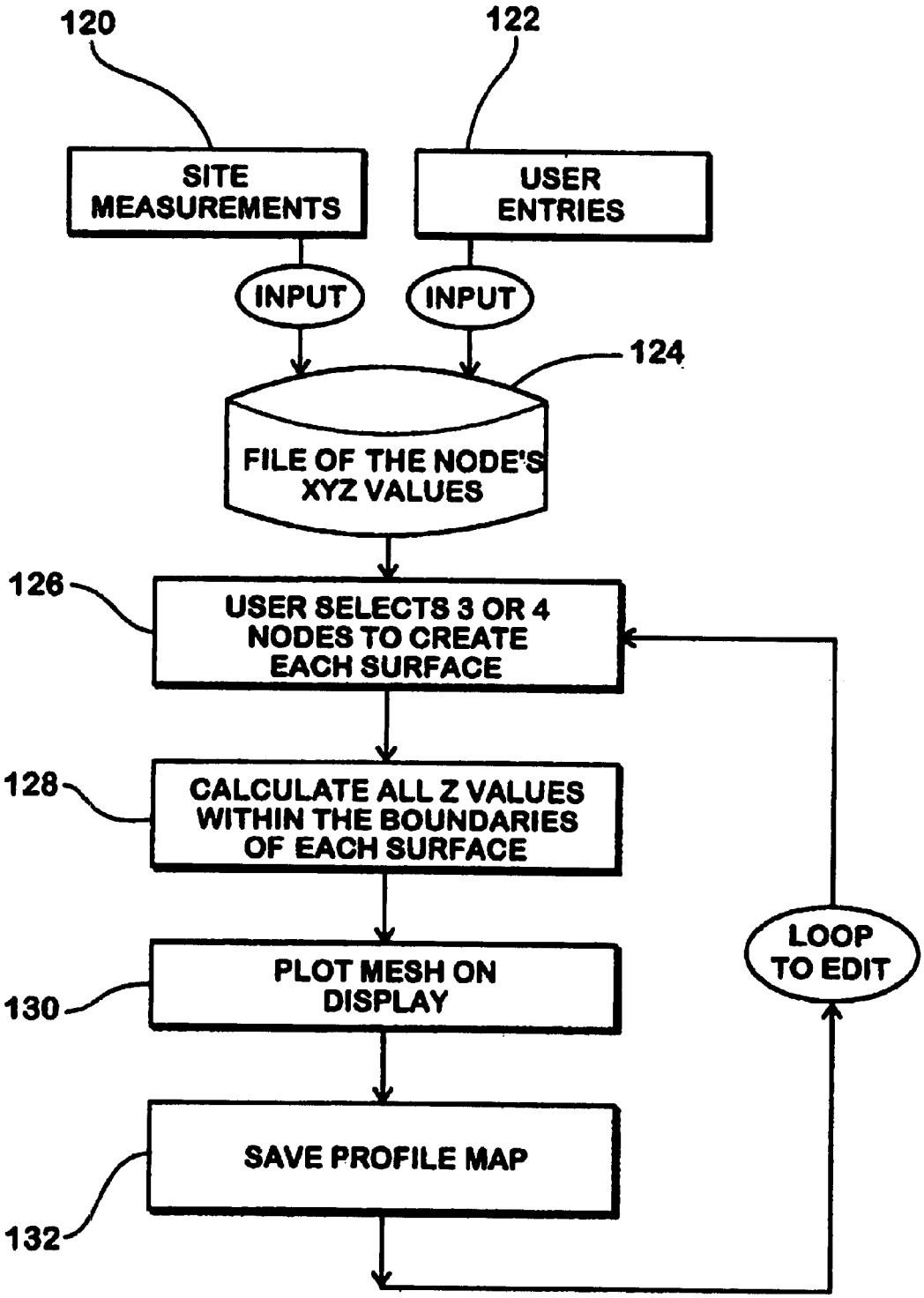
FIG. 11 is a flowchart illustrating a method for creating a stored profile of the desired surface to be contoured.

The creation of the desired profile to be contoured is illustrated in FIG. 11. The profile can be entered into a computer either directly from site measurements 120 or alternatively from user entries 122 based upon engineering drawings or some other previously created compilation of the desired profile. In either case, the information is input into a file 124 that stores the X, Y, and Z values for each of the points, or nodes, that are entered into the computer. Sufficient nodes must be input into file 124 to define the shape of the surface to be contoured. The computer can either be the computer on board contouring machine 20, comprising main processor 72, a keyboard 73, and a display 75, or it may be an ordinary PC or other computer programmed as discussed herein.

From node file 124, a user selects three or four of these nodes to define a surface at step 126. These three or four nodes may define the entire surface to be contoured, or they may only define a portion of the surface to be contoured, leaving the rest of the surface to be defined by selecting additional nodes (see step 126). Based on the selected nodes, the computer creates either a plane or a curved surface that joins the selected nodes (step 128). If only three nodes have been selected, the computer calculates three lines joining these three nodes, thereby creating a triangle and defining a plane. If the number of nodes that have been selected is four, then the computer divides the nodes into two pairs and calculates a line connecting each pair. The computer then calculates two additional lines joining each pair of nodes to each other to thereby define a quadrilateral. At step 128, the computer calculates all the heights, or Z values, for the areas circumscribed by the triangle or quadrilateral. The calculated Z values are displayed in step 130. In step 132 the calculated profile is stored in computer memory for use by contouring machine 20. Control of the profile creation process is returned to step 126, where a user can select additional nodes to create additional surfaces, or to otherwise complete the profile. The more nodes that are selected, the more complex the curvature of the profile can be. While the calculation of the triangles or quadrilaterals joining the selected nodes, along with the Z values defined by these shapes, has been described as utilizing the calculation of lines, it will be understood that other calculation algorithms can be used within the scope of the invention, such as the calculation of arcs, interpolation, splining, or any other suitable technique.

The generated profile of the desired shape of the surface to be contoured can either follow the profile of the subbase or be independent of the subbase. If the contoured surface is to be independent of the subbase, nodes are selected having whatever Z value is desired without regard to the subbase. Variations in the height of the subbase will show up as variations in the thickness of the contoured concrete. If the profile is to follow the shape of the subbase, the profile is created by selecting nodes that are located at a desired, constant height above the subbase. Alternatively, nodes defining the subbase can be selected and a predetermined height (corresponding to the thickness of the concrete) can be automatically added in software to each of the Z values for the nodes. In either case, the contoured surface of the concrete or other material will follow the contours of the subbase.

The independent control of right side 46 and left side 48 of contouring assembly 28 allows contouring machine 20 to contour a three dimensionally curved surface, if desired. If right and left sides 46 and 48 are controlled to remain at the same height throughout the screeding process, a two-dimensional surface can be screeded. If right and left sides 46 and 48 are controlled to have different heights throughout the screeding process, a three dimensionally curved surface can be screeded. Distance measuring unit 78 ensures that left side 48 of contouring assembly 28 will follow a reference surface, such as a previously screeded section of concrete, or another surface as desired, such as the ground, or other physical form. If parallel sections of concrete are screeded, distance measuring unit 78 ensures that new sections are screeded seamlessly with the adjacent, existing screeded sections. It will be understood that target 256 and distance measuring unit 78 can be switched to opposite sides, if desirable. It will also be understood that distance measuring unit 78 on left side 48 can be either replaced or supplemented with another target 256a that is tracked by another tracking device, as illustrated in FIG. 12.

ALTERNATIVE EMBODIMENTS

Figure 12:
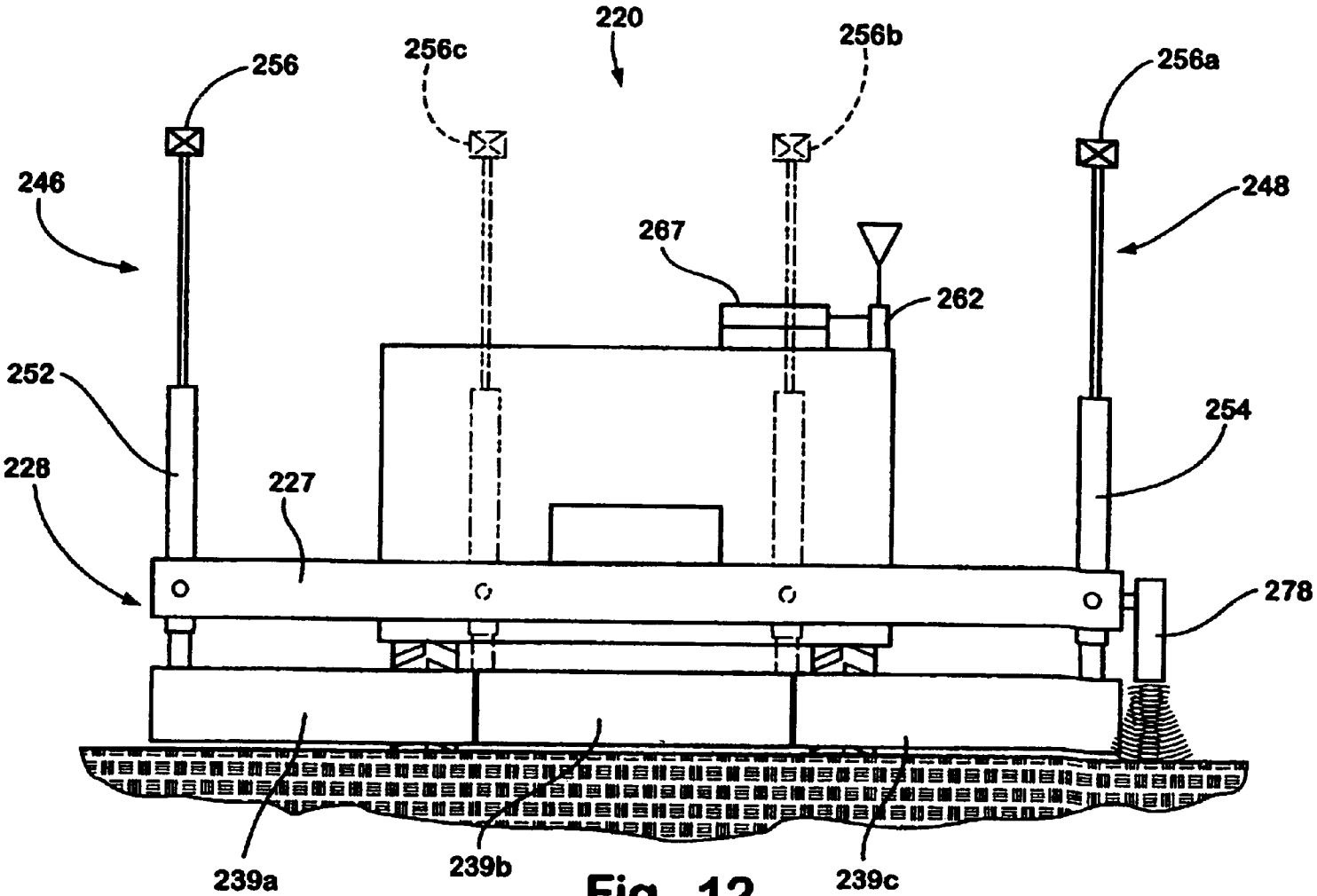
FIG. 12 is a front, elevational view of a contouring device according to a second embodiment of the present invention.

FIG. 12 illustrates an alternative embodiment of contouring or screeding machine 220. Parts corresponding to the previous embodiment are referenced by the same number increased by 200. In this embodiment an additional target 256a is included at left side 248 of contouring assembly 228. A second tracking device 258 (not shown) can be used to track second target 256a. When used in this manner, distance measuring unit 278 does not need to be used and the requirement for a preset form or surface along one side of the surface is not present. The control for left hydraulic cylinder 254 is the same as that disclosed above with respect to right hydraulic cylinder 52. Alternatively, distance measuring unit 278 can be used when desired to control left hydraulic cylinder 54. Screeding machine 220 therefore has the option of controlling left side 48 of contouring assembly 28 with reference to either a stored profile or a preset physical form, depending upon what is most suitable for the application.

Contouring machine 220 can also be modified to include a plurality of intermediate targets 256b and 256c (FIG. 12). In this alternative embodiment contouring machine 220 includes a contouring assembly 228 that is divided into segments 239a–c, which are pivotally connected to each other. Each end of each segment 239, or the pivot joint between the segments, is independently controlled by a separate target 256 mounted on a hydraulic cylinder. A separate tracking device 258 is used for each target 256. The use of a segmented contouring assembly 228 allows a higher degree of lateral (i.e. side-to-side) curvature to be approximated in the contoured surface. Alternately, the height of each segment can be controlled by reference to the relative height of the neighboring segments. In this variation, only a single target and tracking device are used rather than a separate target and tracking device for each segment.

Figure 13:
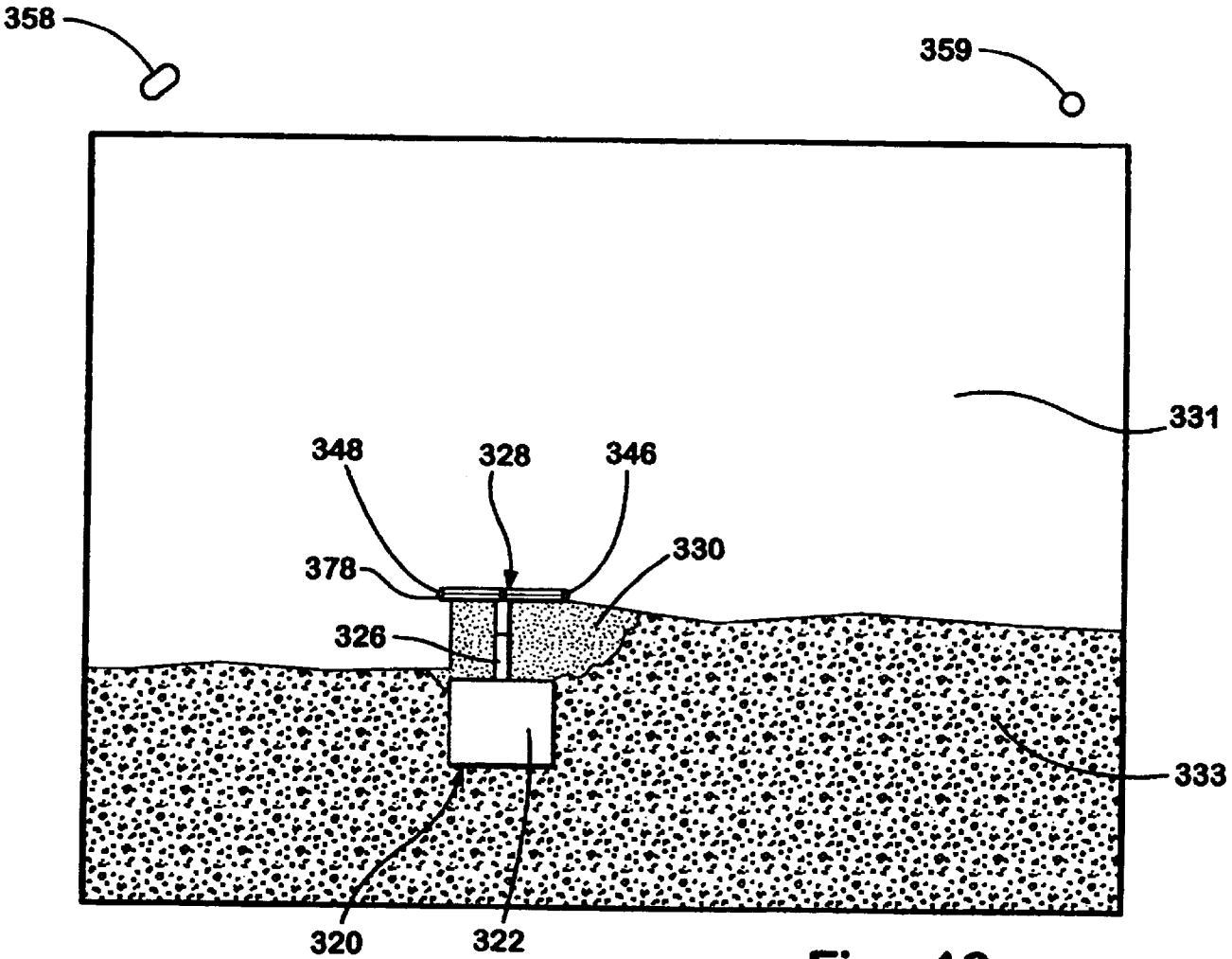
FIG. 13 is a plan view of a contouring device according to a third embodiment of the present invention.

In still another embodiment, contouring machine 320 utilizes a tracking device 358 in combination with a laser beam 359 that is rotated to define a horizontal plane (FIG. 13). In this embodiment, tracking device 358 determines only the X, Y location of right side 346 of contouring assembly 328. Right side 346 of contouring assembly 328 includes a target 356 that is tracked by device 358. The height, or Z position, of right side 346 of contouring assembly 328 is determined by the impingement of rotating laser beam 359, on a pair of vertically movable laser arrays (not shown). The laser arrays consist of a vertical array of laser receivers or sensors. One of the laser arrays is positioned at right side 346 of the contouring machine 320 while the other array is positioned at left side 348. The vertical position of each of the laser arrays is controlled to ensure that at least one of the sensors in the vertical array remains in the plane defined by the rotating laser beam 359. Laser beam 359 will impinge one or more of the laser sensors that are of the same height as laser beam 359. By determining which laser sensor is impinged, the array of laser sensors allows the height of the sides of the contouring assembly to be determined with respect to the horizontal plane created by laser beam 359. The X,Y position of left side 348 of contouring assembly 328 is determined from the output of a directional gyroscope (not shown) mounted on contouring assembly 328. The directional gyro is mounted in such an orientation to produce a signal indicative of the horizontal direction of contouring assembly 328 (e.g. north, south, etc.). This directional signal allows a vector to be added to the X, Y, and Z locations of right side 346 of contouring assembly 328 to thereby determine the position of left side 348 of contouring assembly 328. In summary, the X,Y position of right side 346 is determined from tracking device 358 and target 356 mounted on right side 346. The Z position of both right and left sides 346 and 348 is determined from the reference laser plane created by rotating laser beam 359 and sensed by the pair of sensor arrays on each side of contouring assembly 328. The Z position of left side 348 is determined from the gyroscope in combination with the known location of right side 346. Contouring machine 320 has the advantage of not requiring a tracking device 358 that can track target 356 in three dimensions. Tracking device 358 can therefore be a simpler and more inexpensive device than tracking device 58. Contouring machine 320 includes a base 322 and a telescoping boom 326, and is similarly used to smooth uncured concrete 330 or other loose, spreadable material to a desired shape or contour. As with contouring machine 20, the concrete or other material 331 is contoured either independently of, or with reference to, the subgrade 333.

In yet another embodiment, shown in FIG. 14, contouring or screeding machine 420 utilizes a pair of wires 435a, 435b attached at one end to the center of contouring assembly 428. The other ends of wires 435 are attached at reference points 437a and b, respectively, which are of known location. The wires are preferably made of titanium or other sufficiently strong material. A laser beam 459 is rotated to define a horizontal plane that is detected by a vertical array of laser sensors (not shown) on contouring assembly 428 which is similar to the array of receivers in machine 320 above. The vertical array of laser sensors allows the height of contouring assembly 428 to be determined. As contouring assembly 428 is moved by telescoping boom 426, wires 435a and b unwind. A pair of distance measuring encoders *461* are positioned on the windings of each wire 435a, 435b and the encoders allow contouring machine 420 to calculate the distance each wire has extended from reference points 437a, b. By calculating the length of unwound wires 435a, b, the X,Y position of contouring assembly 428 is calculated. A pair of angle encoders are also positioned on wires 435a, 435b and measure the angles between each wire and contouring assembly 428. From the angular information provided by the two angle encoders, along with the length of the contouring assembly, the X,Y position of each end of the contouring assembly can be determined. The positions of right and left sides 446,448 of contouring assembly 428 are compared by a microprocessor, or other suitable electronic device, to the desired position stored in the profile of the surface to be contoured. Based on the difference between the measured positions and the desired positions, right and left hydraulic cylinders 452 and 454 are adjusted by a controller (not shown) to follow the desired profile. The controller may comprise one or more microprocessors and valves for the hydraulic system, as disclosed in FIG. 5, or other suitable form. The direction of motion of the leveler 428 (i.e. north, south, etc.) can be determined in a calibration step when the direction does not change during the leveling pass or it may be dynamically determined by a gyroscope or other suitable means, or it may be determined from the changes in position of the leveler as it moves.

It will also be understood that in any of the embodiments described above, the location of tracking device 58 and target 56 can be switched. In other words, target 56 can be a stationary target positioned off of machine 20 at a known location while tracking device 58 is positioned on board contouring machine 20. In this alternate configuration, the necessity of transmitting by radio the position information measured by tracking device 58 is eliminated because tracking device 58 is already on board the contouring machined. Tracking device 58 would be positioned on board contouring machine 20 at any location where it would be able to detect the movement of one end of contouring assembly 28 with respect to target 56. In another variation, microprocessors 70, 72, and 74 can also be located off board the vehicle in a separate computer, if desired. In such a situation, only the pulse width modulated signal of processor 74 is transmitted to machine 20, along with the tilt control signal of processor 72.

In another embodiment (not shown), tracking device 58 and target 56 are replaced by a Global Positioning System (GPS) or Differential Global Positioning System (DGPS). The GPS or DGPS receiver is positioned either at the same location as target 56, or at any other suitable location on right side 46 of contouring assembly 28. The GPS or DGPS receiver detects its movement in three dimensions as contouring assembly 28 is moved over the material to be contoured. The three dimensional position information of the GPS or DGPS receiver is communicated to tracking processor 70 and utilized in the same manner the target 56 position information is utilized.

In still another embodiment, the present invention is a kit for retrofitting existing leveling or smoothing machines in order to give them the capability of contouring three dimensionally curved surfaces. The kit is preferably used with existing leveling machines, such as that disclosed in U.S. Pat. No. 4,930,935. Such existing leveling machines include a leveler assembly that is controlled uniformly at both of its ends, thereby leveling only one or two dimensionally curved surfaces. The existing machines typically include a pair of laser sensors disposed at the ends of the leveler assembly. A rotating laser beam is positioned at a location remote from the leveling machine and at a designated height. As the laser beam rotates, the laser defines a plane located at a designated height above the surface to be smoothed. The pair of sensors extend in a vertical direction and detect the rotating laser beam. Based on where the laser beam impinges the sensors, the height of the leveler with respect to the rotating laser beam is determined. The height of the leveler is then adjusted to correspond to the desired height of the surface to be smoothed. The kit includes target 56 that can either be positioned on the leveler assembly or remotely from the leveling machine. The kit also includes tracking device 58 which is positioned at the opposite location from target 56, i.e. either on the leveler assembly or remote from it. A control system 67 (FIG. 5) is further included with the kit to control the right and left sides of the leveling assembly independently, thereby transforming the assembly into a contouring assembly, such as contouring assembly 28. The control system 67 also controls the pivot or tilt of the leveler as explained above in the event the contouring assembly is pivotally mounted. The control system can either control a pair of hydraulic cylinders 52 and 54 based solely on the position of one or more targets 56, or it can control cylinders 52 and 54 based on the combination of the position of target 56 and the output of proximity sensor 78. Proximity sensor 78 is also included in the kit if one end of contouring assembly 28 is to follow a physical form. If the leveling machine includes a leveler assembly with an adjustable tilt or pitch, control system 67 can be programmed to control the pitch of the level assembly based on the slope of the surface to be smoothed.

The kit can also include other components when used to modify an existing leveling machine to one of the alternative embodiments described previously. For example, the kit may include a segmented contouring assembly in which the height of each of the segments of the assembly is individually adjustable, thereby allowing a greater degree of three dimensional curvature to be contoured. Such a kit for a segmented contouring assembly may also include additional targets and tracking devices to be used to measure the position of each of the segments. The position of each segment if fed into a control system that controls each individual segment. In other embodiments, the kit may include a pair of extendable wires that are mounted at one end on the leveler assembly and attached at their other ends to two separate reference points. Such a kit further includes a pair of distance encoders that measure the length of the wires and a pair of angle encoders that measure the angles defined by the wires and the leveling assembly. A control system is included that calculates the position of the leveler assembly based on the length of the wires and adjusts the height of the ends of the leveler independently, thereby allowing the previously existing leveling machine to contour three dimensional surfaces.

While the present invention has been described in terms of the preferred embodiments depicted in the drawings and discussed in the above specification, it will be understood by one skilled in the art that the present invention is not limited to these particular preferred embodiments, but includes any and all such modifications that are within the spirit scope of the present invention as defined in the appended claims.

The embodiments of the invention in which an exclusive property or privilege is claimed are as follows:

1. A surface smoothing device comprising:

a contouring assembly having a first and second end, said contouring assembly able to be moved over an area to be contoured to contour at least one of material positioned on a reference surface and the material of the reference surface to a desired surface shape;

a stored profile of the desired shape of the surface;

a first sensing apparatus that uses a first method to sense the position and height of said first end of said contouring assembly, the height of said first end of said contouring assembly being sensed without respect to the reference surface;

a second sensing apparatus that uses a second method to sense the [position and] height of said second end of said contouring assembly *above one of the material positioned on a reference surface and the material of the reference surface adjacent said contouring assembly*, said second method being different from said first method; and a controller that adjusts the height of said first end of said contouring assembly based on the position and height sensed by said first sensing apparatus and said stored profile and that *independently* adjusts the height of said second end of said contouring assembly based on the [distance between said second end of said contouring assembly and a physical reference] *height sensed by said second sensing apparatus of said second end of said contouring assembly above one of the material positioned on a reference surface and the material of the reference surface* adjacent said contouring assembly[, such as the reference surface, a previously placed paved surface, a rail, a board, a string or a wire].

2. The device of claim 1 wherein said contouring assembly includes a screed that screeds uncured concrete.

3. The device of claim 2 further including an auger positioned adjacent a side of said screed, said auger oriented substantially parallel to said screed.

4. The device of claim 3 further including a plow positioned adjacent a side of said auger opposite said screed such that said auger is intermediate said plow and said screed, said plow oriented substantially parallel to said auger.

5. The device of claim 4 wherein said contouring assembly is mounted on a boom cantilevered from a base, said contouring assembly able to be moved toward side base on said boom for spreading and smoothing the uncured concrete.

6. The device of claim 2 wherein said controller adjusts the height of said first end of said contouring assembly by controlling a fluid cylinder attached to said first end of said contouring assembly.

7. The device of claim 6 wherein said controller sends at least one pulse width modulated control signal to a valve that controls the fluid flow to said hydraulic cylinder.

8. The device of claim 1 wherein said first sensing apparatus comprises:

a target positioned on said first end of said contouring assembly;

a tracking device that tracks the movement of said target as said target is moved, said tracking device able to measure the position of said target in three dimensions; and, a transmitter that transmits the three dimensional position measurement to said controller.

9. The device of claim 1 wherein said second sensing apparatus comprises a proximity sensor positioned on said second end of said contouring assembly.

10. The device of claim 1 wherein said surface smoothing device includes a base able to be positioned adjacent a surface to be smoothed, said contouring assembly mounted for movement with respect to said base while said base remains stationary whereby said surface is contoured by said contouring assembly.

11. *A surface smoothing device comprising:*

*a contouring assembly having a first and second end, said contouring assembly able to be moved over an area to be contoured to contour at least one of material positioned on a reference surface and the material of the reference surface to a desired surface shape;*

*a stored profile of the desired shape of the surface;*

*a base able to be positioned adjacent the surface to be smoothed, said contouring assembly mounted for movement with respect to said base while said base remains stationary whereby said surface is contoured by said contouring assembly;*

[The device of claim 10 wherein] *a first sensing apparatus that uses a first method to sense the position and height of said first end of said contouring assembly, the height of said first end of said contouring assembly being sensed without respect to the reference surface,* said first sensing apparatus [comprises] *comprising* a tracking laser and an infrared sensor positioned remotely from said base and a target positioned on said first end of said contouring assembly, said infrared sensor able to sense an infrared source on said target and said tracking laser able to track the movement of said target*;*

*a second sensing apparatus that uses a second method to sense the height of said second end of said contouring assembly, said second method being different from said first method; and*

*a controller that adjusts the height of said first end of said contouring assembly based on the position and height sensed by said first sensing apparatus and said stored profile and that adjusts the height of said second end of said contouring assembly based on the distance between said second end of said contouring assembly and a physical reference adjacent said contouring assembly.*

12. The device of claim 11 wherein said second sensing apparatus comprises an ultrasonic sensor.

13. The device of claim 1 wherein said first and second sensing apparatuses operate without physically contacting the ground.

14. The device of claim 1 wherein said first sensing apparatus utilizes global positioning satellites to sense the position and height of said first end of said contouring assembly.

15. A surface contouring device for contouring a surface over a sub-grade comprising:

a base;

a boom movably mounted on said base;

a contouring assembly mounted on said boom, said contouring assembly having a first end and a second end, said contouring assembly mounted on said boom for movement with respect to said base and able to smooth a surface while being moved on said boom while said base remains stationary; and, a control system able to independently adjust the heights of said first and second ends of said contouring assembly as said contouring assembly moves whereby said contouring assembly is capable of smoothing a three dimensional surface, said control system including a first sensor that senses the height of said first end of said contouring assembly using a first method, and a second sensor that senses the height of said second end of said contouring assembly using a second method, said second method different from said first method, a least one of said first and second methods sensing the height of said first or second end of said contouring assembly without reference to said sub-grade.

16. The device of claim 15 wherein said contouring assembly includes a vibratory screed and an auger disposed substantially parallel to said vibratory screed.

17. The device of claim 16 further comprising a pivoting mechanism able to pivot said vibratory screed and said auger in order to conform to the three dimensional surface, said pivot mechanism able to pivot said vibratory screed and said auger about an axis substantially parallel to said vibratory screed and said auger.

18. The device of claim 15 wherein said control system comprises:

a target positioned at one of said first end of said contouring assembly and a location remote from said first of said contouring assembly, a tracking device positioned at the other of said first end of said contouring assembly and the position remote from said contouring assembly, said tracking device measuring the position of said target in three dimensions; and a distance measuring sensor attached at said second end of said contouring assembly.

19. The device of claim 18 wherein said contouring assembly includes a vibrating screed able to vibrate and smooth freshly poured concrete.

20. The device of claim 15 wherein said control system comprises at least two fluid cylinders able to independently raise and lower said first and second ends of said contouring assembly.

21. The device of claim 19 wherein said control system includes a distance measuring sensor for controlling the height of one of said first said second ends of said contouring assembly.

22. The device of claim 19 wherein said distance measuring sensor is one of a laser sensor and an ultrasonic sensor.

23. The device of claim 15 wherein said contouring assembly comprises a plurality of discrete segment pivotally attached together, said control system able to adjust the heights of each of said discrete segments independently of each other.

24. The device of claim 15 wherein said control system includes a position sensor that measures the position of said contouring assembly in three dimensions.

25. [The device of claim 24 wherein said position sensor comprises:] *A surface contouring device for contouring a surface over a sub-grade comprising:*

*a base;*

*a boom movably mounted on said base;*

*a contouring assembly mounted on said boom, said contouring assembly having a first end and a second end, said contouring assembly mounted on said boom for movement with respect to said base and able to smooth a surface while being moved on said boom while said base remains stationary; and*

*a control system able to independently adjust the heights of said first and second ends of said contouring assembly as said contouring assembly moves whereby said contouring assembly is capable of smoothing a three dimensional surface, said control system including a first sensor that senses the height of said first end of said contouring assembly using a first method, and a second sensor that senses the height of said second end of said contouring assembly using a second method, said second method different from said first method, at least one of said first and second methods sensing the height of said first or second end of said contouring assembly without reference to said sub-grade, said control system further including a position sensor that measures the position of said contouring assembly in three dimensions, said position sensor comprising:*

*a plurality of reference points positioned at known locations;* a first *wire extendably connected to said contouring assembly and a first one of said plurality of reference points;*

[and] a second wire [having first and second ends;] *extendably connected to said contouring assembly and a second one of said plurality of reference points; and*

[a pair of reference points to which the first end of said first and second wires is affixed;

a pair of rollers attached to said contouring assembly, said first and second wires attached to and wound on said rollers at said second end, said rollers able to wind and unwind as said contouring assembly is moved;]

a [pair of] *plurality of* distance measuring encoders that measure the [number of rotations of said rollers] *extension of said first and second wires* as said contouring assembly moves[; and a pair of angle encoders that measure the angles formed between each of said first and second wires and said contouring assembly].

26. The device of claim 25 further including:

a laser beam that rotates and thereby defines a plane at a specific height; and a laser sensor disposed on said contouring assembly that detects the height of said laser sensor with respect to said plane.

27. The device of claim 24 wherein said control system comprises:

a tracking device that tracks the movement of said contouring assembly and measures the position of said contouring assembly in two dimensions;

a laser beam that rotates and thereby defines a plane at a specific height;

a laser sensor disposed on said contouring assembly that detects the height of said laser sensor with respect to said plane; and a gyroscope mounted on said contouring assembly that measures the orientation of said contouring assembly.

28. A method for smoothing a surface over a sub-grade to a desired three dimensional shape, comprising:

storing said desired three-dimensional shape in a computer memory;

providing a contouring assembly having a first and second end;

moving said contouring assembly over said three-dimensional surface to be smoothed;

using a first method to determine the position of said first end of said contouring assembly in three dimensions as said contouring assembly moves, said position of said first end of said contouring assembly being determined without respect to the height of the sub-grade;

adjusting the height of said first end of said contouring assembly to correspond to the height of said desired three-dimensional shape;

using a second method different from said first method to determine the height of said second end of said contouring assembly from a surface independently of the determination of the position of the first end of said contouring assembly; and adjusting the height of said second end of said contouring assembly to maintain a constant height above said surface.

29. The method of claim 28 wherein the determining of the position of said first end of said contouring assembly in three dimensions comprises:

positioning a tracking device in a stationary location at a position remote from said contouring assembly;

tracking the location of said first end of said contouring assembly with said tracking device; and transmitting the location of said first end of said contouring assembly from said tracking device to a controller that controls said first end of said contouring assembly.

30. The method of claim 29 wherein the transmitting of the location of said first end of said contouring assembly is performed by a radio link between said transmitting device and said controller.

31. The method of claim 28 wherein the determining of the height of said second end of said contouring assembly from the surface is performed by an ultrasonic proximity sensor.

32. The method of claim 28 wherein the determining of the height of said second end of said contouring assembly from the surface is performed by a laser proximity sensor.

33. The method of claim 28 wherein the step of determining the position of said first end of said contouring assembly in three dimensions comprises:

measuring the distance of said contouring assembly away from two known reference points;

measuring the height of said first end of said contouring assembly with respect to a known height reference;

measuring the angles formed between each of said reference points and said contouring assembly; and calculating the position of said first end of said contouring assembly based on the measurements of height and distance and the angular measurements.

34. *A method for smoothing a surface over a sub-grade to a desired three dimensional shape, comprising:*

*storing said desired three-dimensional shape in a computer memory;*

*providing a contouring assembly having a first and second end;*

*moving said contouring assembly over said three-dimensional surface to be smoothed;*

*using a first method to determine the position of said first end of said contouring assembly in three dimensions as said contouring assembly moves, said position of said first end of said contouring assembly being determined without respect to the height of the sub-grade, said first method to determine position comprising:*

[The method of claim 33 wherein the step of measuring the distance of said contouring assembly away from two known reference points comprises:] (*a*) *measuring the distance of said contouring assembly away from two known reference points by* affixing the ends of two wires to said contouring assembly[;], affixing the other ends of said two wires to separate *ones of the* reference points positioned at known locations[;], and determining the length of each of said two wires from said contouring assembly to each said reference point*;*

(*b*) *measuring the height of said first end of said contouring assembly with respect to a known height reference;*

(*c*) *measuring the angles formed between each of said reference points and said contouring assembly; and*

(*d*) *calculating the position of said first end of said contouring assembly based on the measurements of height and distance and the angular measurements;*

*adjusting the height of said first end of said contouring assembly to correspond to the height of said desired three-dimensional shape;*

*using a second method different from said first method to determine the height of said second end of said contouring assembly from a surface independently of the determination of the position of the first end of said contouring assembly; and*

*adjusting the height of said second end of said contouring assembly to maintain a constant height above said surface.*

35. [The method of claim 28 wherein the steps of determining] *A method for smoothing a surface over a sub-grade to a desired three dimensional shape, comprising:*

*storing said desired three-dimensional shape in a computer memory;*

*providing a contouring assembly having a first and a second end;*

*moving said contouring assembly over said three-dimensional surface to be smoothed;*

*using a first method to determine the position of said first end of said contouring assembly in three dimensions as said contouring assembly moves, said position of said first end of said contouring assembly being determined without respect to the height of the sub-grade, said first method to determine* the position of said first end of said contouring assembly in three dimensions [comprises] *comprising*:

(*a*) determining the location of said first end of said contouring assembly in two dimensions with respect to a first reference; and (*b*) determining the location of said first end of said contouring assembly in a third dimension with respect to a second reference;

*adjusting the height of said first end of said contouring assembly to correspond to the height of said desired three-dimensional shape;*

*using a second method different from said first method to determine the height of said second end of said contouring assembly from a surface independently of the determination of the position of the first end of said contouring assembly; and*

*adjusting the height of said second end of said contouring assembly to maintain a constant height above said surface.*

36. The method of claim 35 wherein said first and second references are laser emitting devices.

* * * * *

UNITED STATES PATENT AND TRADEMARK OFFICE

CERTIFICATE OF CORRECTION

PATENT NO. : RE 39,834 E
APPLICATION NO. : 10/430727
DATED : September 11, 2007
INVENTOR(S) : Carl B. Kieranen et al.

It is certified that error appears in the above-identified patent and that said Letters Patent is hereby corrected as shown below:

Column 1:
Line 29, “present” should be --preset--.

Column 2:
Line 55, “movable” should be --movably--.

Column 3:
Line 42, “the” should be --that--.

Column 4:
Line 7, “eliminating” should be --eliminates--.

Column 5:
Line 17, “stabilized” should be --stabilizer--.

Column 6:
Line 53, “comer-cube” should be --corner-cube--.

Column 8:
Line 43, “in” should be --it--.

Column 9:
Line 48, “cylinder” should be --cylindrical--.

Column 11:
Line 41, “profile” should be --processor--.

Column 14:
Line 63, “446,448” should be --446, 448--

Column 16:
Line 13, “level” should be --leveler--.
Line 25, “if” should be --is--.

Column 17:
Line 23, Claim 5, “side” should be --said--.
Line 59, Claim 11, Insert --[The device of claim 1 wherein said surface smoothing device includes]-- before “a”.

UNITED STATES PATENT AND TRADEMARK OFFICE

CERTIFICATE OF CORRECTION

PATENT NO. : RE 39,834 E
APPLICATION NO. : 10/430727
DATED : September 11, 2007
INVENTOR(S) : Carl B. Kieranen et al.

It is certified that error appears in the above-identified patent and that said Letters Patent is hereby corrected as shown below:

Column 18:
Line 50, Claim 15, "a" should be --at--.
Line 67, Claim 18, Insert --end-- before "of".
Line 67, Claim 18, "," should be --;--.

Column 19:
Line 17, Claim 21, "said" should be --and-- in the second occurrence.
Line 23, Claim 23, "segment" should be --segments--.
Line 40, Claim 25, Insert --,-- after "and".

Column 21:
Line 34, Claim 34, Insert --[The method of claim 28 wherein the step of determining the position of said first end of said contouring assembly in three dimensions comprises:]-- after "sub-grade,".

Signed and Sealed this

Thirtieth Day of September, 2008

JON W. DUDAS
*Director of the United States Patent and Trademark Office*